United States Patent
Ono et al.

(10) Patent No.: US 8,864,382 B2
(45) Date of Patent: Oct. 21, 2014

(54) PRELOAD MEASURING DEVICE FOR DOUBLE ROW ROLLING BEARING UNIT

(75) Inventors: Koichiro Ono, Fujisawa (JP); Takeshi Takizawa, Fujisawa (JP); Mamoru Aoki, Fujisawa (JP)

(73) Assignee: NSK Ltd., Tokyo (JP)

( * ) Notice: Subject to any disclaimer, the term of this patent is extended or adjusted under 35 U.S.C. 154(b) by 1503 days.

(21) Appl. No.: 12/282,340

(22) PCT Filed: Mar. 9, 2007

(86) PCT No.: PCT/JP2007/054725
§ 371 (c)(1),
(2), (4) Date: Sep. 9, 2008

(87) PCT Pub. No.: WO2007/105655
PCT Pub. Date: Sep. 20, 2007

(65) Prior Publication Data
US 2009/0052825 A1    Feb. 26, 2009

(30) Foreign Application Priority Data

Mar. 10, 2006 (JP) .................... 2006-065675

(51) Int. Cl.
*F16C 32/00* (2006.01)
*F16C 13/00* (2006.01)
(Continued)

(52) U.S. Cl.
CPC ............ *G01L 5/0023* (2013.01); *B60B 7/0013* (2013.01); *B60B 7/066* (2013.01); *F16C 25/06* (2013.01); *B60B 27/0005* (2013.01); *B60B 27/0068* (2013.01); *F16C 19/522* (2013.01); *B60B 27/0094* (2013.01); *G01L 5/12* (2013.01); *F16C 19/186* (2013.01); *F16C 41/007* (2013.01); *B60B 7/061* (2013.01); *F16C 2326/02* (2013.01)
USPC ........................................... 384/448; 384/544

(58) Field of Classification Search
USPC ...................... 384/448, 544, 589; 73/862.541
See application file for complete search history.

(56) References Cited

U.S. PATENT DOCUMENTS 5,877,433 A * 3/1999 Matsuzaki et al. ........ 73/862.381
7,320,256 B2 * 1/2008 Ono .......................... 73/862.541
(Continued)

FOREIGN PATENT DOCUMENTS

JP           62-3365 B       1/1987
JP           3-209016 A      9/1991
(Continued)

OTHER PUBLICATIONS

Chinese Office Action in counterpart Chinese Application No. 200780008691.8, dated Feb. 24, 2010.

*Primary Examiner* — Alan B Waits
(74) *Attorney, Agent, or Firm* — Sughrue Mion, PLLC

(57) ABSTRACT

A preload measuring device for a double row rolling bearing unit includes an outer bearing ring member having double rows of outer ring raceways on an inner circumferential surface, an inner bearing ring member having double rows of inner ring raceways on an outer circumferential surface, rolling elements rollably arranged between the outer ring raceways and the inner ring raceways in each of the rows such that contact angles given to the respective rows are opposite to one another, axial displacement measuring means for obtaining an axial relative displacement between the outer bearing ring member and the inner bearing ring member, inclination angle measuring means for obtaining an inclination angle between center axes of the outer bearing ring member and the inner bearing ring member, and preload calculating means for obtaining a preload applied to the rolling elements based on the inclination angle and the axial relative displacement.

18 Claims, 18 Drawing Sheets

(51) Int. Cl.
*B60B 7/00* (2006.01)
*G01L 5/00* (2006.01)
*B60B 7/06* (2006.01)
*F16C 25/06* (2006.01)
*B60B 27/00* (2006.01)
*F16C 19/52* (2006.01)
*G01L 5/12* (2006.01)
*F16C 19/18* (2006.01)
*F16C 41/00* (2006.01)

(56) References Cited

U.S. PATENT DOCUMENTS

| | | | |
|---|---|---|---|
| 7,320,257 B2 * | 1/2008 | Takizawa et al. | 73/862.541 |
| 7,534,046 B2 * | 5/2009 | Yamamoto | 384/448 |
| 7,686,516 B2 * | 3/2010 | Shibasaki et al. | 384/448 |
| 7,780,358 B2 * | 8/2010 | Ozaki et al. | 384/448 |
| 2006/0045400 A1 * | 3/2006 | Yamamoto | 384/448 |
| 2006/0070462 A1 * | 4/2006 | Takizawa et al. | 73/862.541 |
| 2006/0153482 A1 * | 7/2006 | Koike et al. | 384/448 |

FOREIGN PATENT DOCUMENTS

| | | | | |
|---|---|---|---|---|
| JP | 2001-349327 A | 12/2001 | | |
| JP | 2002-317818 A | 10/2002 | | |
| JP | 2002-327739 A | 11/2002 | | |
| JP | 2004-3918 A | 1/2004 | | |
| JP | 2004077159 A * | 3/2004 | | G01D 5/245 |
| JP | 2005-31063 A | 2/2005 | | |
| JP | 2006-300086 A | 11/2006 | | |
| JP | 2006-317420 A | 11/2006 | | |
| JP | 2007-57342 A | 3/2007 | | |
| WO | WO 2005116602 A1 * | 12/2005 | | G01L 5/00 |

* cited by examiner

PRELOAD MEASURING DEVICE FOR DOUBLE ROW ROLLING BEARING UNIT

TECHNICAL FIELD

A preload measuring device according to the present invention is used to see appropriateness of a preload applied to rolling elements of a double row rolling bearing unit. Namely, the present invention relates to a preload measuring device for a double row rolling bearing unit which is incorporated in a rotary support portion of a variety of mechanical systems and in which the appropriateness of the preload has an influence on performance thereof. The preload measuring device according to the present invention is used with a double row rolling bearing unit which rotatably supports, for example, a wheel of a motor vehicle, a spindle of a variety of machine tools such as a machining center, or a drum of a variety of industrial machinery such as a printer and a rolling mill.

BACKGROUND ART

A double row rolling bearing unit rotatably supports, for example, a wheel relative to a suspension system of a vehicle. In order to ensure running stability of the vehicle, vehicle running state stabilizing systems such as anti-lock brake system (ABS), traction control system (TCS) and electronic stability control (ESC, e.g. VSC) are widely being used. According to the running state stabilizing systems such as ABS, TCS and ESC (VSC), the running state of the vehicle at the time of braking or acceleration can be stabilized. However, in order to ensure the running stability of the vehicle under severer conditions, brakes and an engine needs to be controlled by taking in more information which influences the running stability of the vehicle.

The conventional running state stabilizing systems such as ABS, TCS and ESC (VSC) control the brakes and the engine in accordance with a detection of a slippage between the tires and the road surface, i.e., execute so-called feedback controls. Consequently, the control of the brakes and the engine is slightly delayed. In other words, for the purpose of improving performance under severe conditions, they cannot execute so-called feedforward controls to eliminate the possibility of generation of slippage between the tires and the road surface or to prevent a so-called one-side braking where braking force becomes extremely different between the right and left wheels.

In order to execute feedforward controls, a load measuring device for measuring an axial load applied to a wheel may be incorporated in a double row rolling bearing unit which supports the wheel with respect to a suspension system.

For example, JP 3-209016 A discloses a double row rolling bearing unit with a load measuring device in which load sensors are arranged at a plurality of locations on an inner surface of a fixed side flange provided on an outer circumferential surface of an outer ring, i.e., at portions surrounding screw holes into which bolts are respectively screwed to join the fixed side flange to a knuckle. In a state in which the outer ring is fixedly supported on the knuckle, each of the load sensors are held between an outer surface of the knuckle and the inner surface of the fixed side flange. An axial load applied between the wheel and the knuckle is measured by the respective load sensors.

JP 2004-3918 A discloses a double row rolling bearing unit with an axial load measuring device including displacement sensor units which are supported at four locations along a circumference of an outer ring and a detectable ring having an L-shaped cross section which is fixedly fitted on a hub. Displacements of the hub in a radial direction and an axial direction relative to the outer ring are detected at the four locations by the displacement sensor units and the detected ring, and based on the detected values at the respective locations, a direction and an amount of a load applied on the hub are obtained.

JP 62-3365 B2 discloses a method including providing a strain gauge, on a member corresponding to an outer ring whose rigidity is partially reduced, for detecting a dynamic strain, obtaining a revolution speed of rolling elements from a passing frequency of the rolling elements detected by the strain gauge, and measuring an axial load applied to a rolling bearing from the revolution speed.

Further, JP 2005-31063 A discloses a rolling bearing unit with a load measuring device in which rolling elements are arranged in double rows with mutually opposite contact angles given thereto, and a radial load or an axial load applied between a stationary bearing ring, such as an outer ring, and a rotary bearing ring, such a hub, is measured based on revolution speeds of the respective rows of rolling elements.

Meanwhile, in the double row rolling bearing units being the target of obtaining of an axial load or a radial load applied between the stationary bearing ring member and the rotary bearing ring member as described above, a preload is applied to the rolling elements thereof. The preload is applied to increase support rigidity of the rotary member such as the wheel and to enhance rotation accuracy of the rotary member.

In addition, in order to bring out sufficient performance of the double row rolling bearing unit, it is important to control the value of the preload to be within an appropriate range. If the value of the preload becomes insufficient, rigidity of the rolling bearing unit becomes low, whereby mechanical devices become likely to vibrate during operation. On the contrary, if the value of the preload becomes excessive, a surface pressure at rolling contact portions inside the double row rolling bearing unit becomes excessive, whereby the dynamic torque of the double row rolling bearing unit becomes large. As a result, not only is the performance of the mechanical devices is deteriorated but also rolling fatigue life of respective surfaces (a raceway surface and a rolling surface) at the rolling contact portions is reduced.

Accordingly, prior to the installation of the rolling bearing unit in the rotation support portion of the machineries, the preload applied to the rolling elements of the rolling bearing unit is measured so as to impart a proper preload to the rolling elements (see, e.g., JP 2001-349327 A and JP 2002-317818 A). In such a preload measuring method, however, the preload applied to the rolling element cannot be measured for the double row rolling bearing units that are already installed in the rotation support portion of the machinery and are in use.

If the preload applied to the rolling elements remains to be the proper value, there will be no specific problems. However, there are cases where the preload that has been once applied to the rolling elements changes (decreases) during the use of long period of time. The lower the preload, the larger the variation in revolution speed of the rolling elements or the relative displacement between the stationary bearing ring and the rotary bearing ring. On the contrary, the higher the preload, the smaller the variation in revolution speed of the rolling elements or the relative displacement between the stationary bearing ring and the rotary bearing ring. Because of this, depending on the changes of the preload, there is a possibility that the load applied to the double row rolling bearing unit cannot be obtained with an accuracy required, for example, to ensure the running stability of the vehicle. From the reasons given above, it is important to accurately grasp the preload applied to the rolling elements of the double row rolling bearing unit.

DISCLOSURE OF THE INVENTION

In view of the situations described above, it is an object of the present invention to provide a preload measuring device for obtaining a preload applied to rolling elements of a double row rolling bearing unit which is actually installed in a rotation support portion of a variety of mechanical apparatuses.

According to a first aspect of the invention, a preload measuring device for a double row rolling bearing unit includes an outer bearing ring member, an inner bearing ring member, a plurality of rolling elements, axial displacement measuring means, inclination angle measuring means, and preload calculating means. The outer bearing ring member has double rows of outer ring raceways on an inner circumferential surface thereof. The inner bearing ring member has double rows of inner ring raceways on an outer circumferential surface thereof. The plurality of rolling elements are rollably arranged between the outer ring raceways and the inner ring raceways in each of the rows such that contact angles given to the respective rows of the rolling elements are opposite to one another. The axial displacement measuring means obtains an axial relative displacement between the outer bearing ring member and the inner bearing ring member (a pure axial displacement which is a component of the relative displacement between the respective bearing ring members in an axial direction of the respective bearing ring members). The inclination angle measuring means obtains an inclination angle between a center axis of the outer bearing ring member and a center axis of the inner bearing ring member.

The preload calculating means obtains a preload applied to the plurality of rolling elements based on the inclination angle and the axial relative displacement. Specifically, according to a second aspect of the invention, the preload measuring means may obtain the preload based on a comparison between the axial relative displacement and the inclination angle. More specifically, according to a third aspect of the invention, the preload measuring means may obtain the preload based on a ratio between the axial relative displacement and the inclination angle.

According to a fourth aspect of the invention, the axial displacement measuring means and the inclination angle measuring means may be incorporated in the double row rolling bearing unit. More specifically, according to a fifth aspect of the invention, the preload measuring device further includes an encoder having a detectable surface on a circumferential surface thereof, in which a characteristic of the detectable surface changes alternately and at regular intervals with respect to a circumferential direction and a phase of a characteristic change gradually changes with respect to an axial direction, and a plurality of sensors having detecting portions facing different portions on the detectable surface of the encoder. The encoder is disposed on either one of the outer bearing ring member and the inner bearing member that rotates when in use, such that the detectable surface is concentrically positioned thereto. The plurality of sensors are supported by the other of the outer bearing ring member and the inner bearing ring member that does not rotate when in use. The axial displacement measuring means and the inclination angle measuring means obtain, respectively, the axial relative displacement and the inclination angle based on a phase difference between output signals from the plurality of sensors.

According to a sixth aspect of the invention, the preload measuring device further includes an encoder having a detectable surface on a circumferential surface thereof, in which a characteristic of the detectable surface changes alternately with respect to a circumferential direction and a pitch of a characteristic change gradually changes with respect to an axial direction, and a plurality of sensors having detecting portions facing the detectable surface of the encoder. The encoder is disposed on either one of the outer bearing ring member and the inner bearing member that rotates when in use, such that the detectable surface is concentrically positioned thereto. The plurality of sensors are supported by the other of the outer bearing ring member and the inner bearing ring member that does not rotate when in use. The axial displacement measuring means and the inclination angle measuring means obtain, respectively, the axial relative displacement and the inclination angle based on a duty ratio of output signals from the plurality of sensors. In order to change the pitch of the characteristic change on the circumferential surface of the encoder, trapezoidal or V-shaped (triangular) corrugations may be formed on the circumferential surface (the detectable surface) of the encoder. Alternatively, through holes and pillar sections may be alternately formed on the circumferential surface (the detectable surface) of the encoder. Further, a permanent magnet encoder in which S poles and N poles are arranged in same patterns may be used.

According to a seventh aspect of the invention, the plurality of sensors may be arranged to face an upper end portion and a lower end portion of the detectable surface of the encoder respectively.

According to an eighth aspect of the invention, the preload measuring device may further include load calculation means for obtaining a load acting between the outer bearing ring member and the inner bearing ring member based on one or both of the axial relative displacement obtained by the axial displacement measuring means and the inclination angle obtained by the inclination angle measuring means.

According to a ninth aspect of the invention, the load calculating means may obtain the load acting between the outer bearing ring member and the inner bearing ring member based on a map indicative of a relationship between an axial load and the axial displacement or the inclination angle, and the preload calculating means may correct the map based on the preload so obtained.

According to a tenth aspect of the invention, the inner bearing ring member may be a hub which rotates together with a wheel of a vehicle, and the outer bearing ring member may be fixedly supported on a suspension system of the vehicle.

According to an eleventh aspect of the invention, the preload calculating means may obtain the preload while the axial load is acting on the hub toward an outside with respective to a width direction of the vehicle, and may correct the map based on the preload so obtained.

According to a twelfth aspect of the invention, the preload calculating means may correct the axial relative displacement obtained by the displacement measuring means based on the inclination angle obtained by the inclination angle measuring means, and may obtain the preload based on the axial relative displacement so corrected. By this configuration, a function to remove influence of an axial displacement triggered by temperature change or the like can be given to the preload calculation means.

Figure 1:
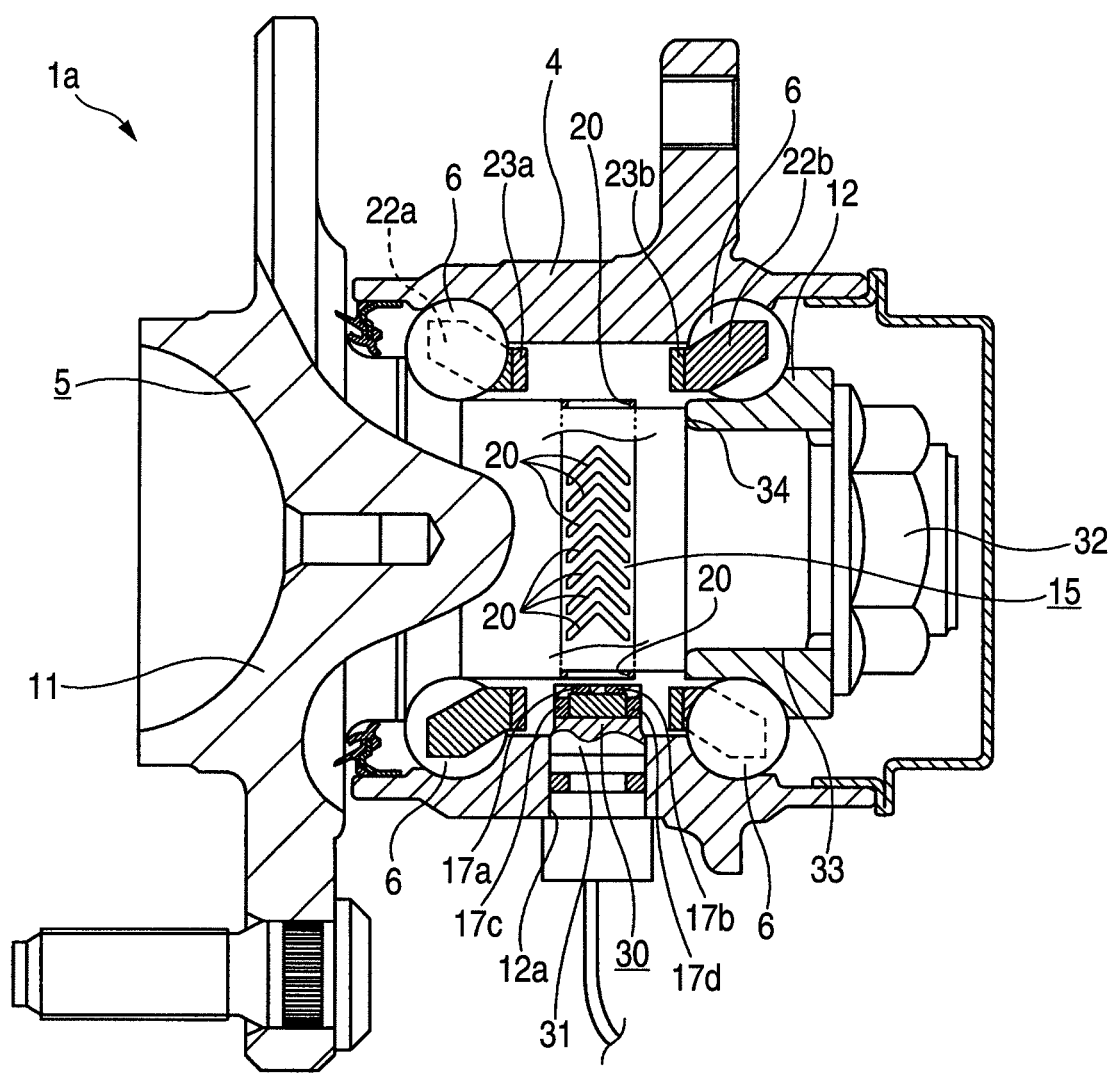
FIG. 1 is a sectional view showing a wheel supporting double row rolling bearing unit with a load measuring device according to a first embodiment of the invention.

EXPLANATION OF REFERENCE NUMERALS 1, 1a, 1b wheel supporting double row rolling bearing unit
2 wheel
3 road surface
4 outer bearing ring member
5 inner bearing ring member (hub)
6 rolling element
7 knuckle
8 load measuring device
9 outer ring raceway
10 mounting portion
11 hub main body
12 inner ring
12a mounting hole
13 flange
14 inner ring raceway
15, 15a, 15b encoder
16 cover
17a, 17b, 17a1, 17a2, 17b1, 17b2 sensor
18 first characteristic changing portion
19 second characteristic changing portion
20, 20a, 20b through hole
22a, 22b cage
23a, 23b revolution speed detecting encoder
30 sensor unit
31 holder
32 nut
33 small diameter stepped portion
34 step surface
40a, 40b pillar section
50 recessed portion
60 protrusion.

BEST MODE FOR CARRYING OUT THE INVENTION

Hereinafter, embodiments of the invention will be explained with reference to the drawings.
First Embodiment A double row rolling bearing unit with a load measuring device according to a first embodiment of the invention will be explained with reference to FIG. 1.

As is shown in FIG. 1, the double row rolling bearing unit with a load measuring device 1a according to the first embodiment includes an outer ring 4, which is a stationary bearing ring supported on a suspension system and does not rotate, and a hub 5, which is a rotary bearing ring fixedly supporting (joint fixing) a wheel and rotates. The hub 5 is rotatably supported inside the outer ring 4 via a plurality of rolling elements 6, 6.

The hub 5 includes a hub main body 11 and an inner ring 12 which is fixedly connected to the hub main body 13, and back-to-back duplex type contact angles and a preload are given to the rolling elements 6, 6a. Namely, the inner ring 12 fitted on a small diameter stepped portion 33 of the hub main body 11 is pressed against a step surface 34 which lies at an end portion of the small diameter stepped portion 33 by fastening a nut 32 screwed on to the hub main body 11. By controlling the tightening torque of the nut 32 so that a space between inner ring raceways provided in double rows on an outer circumferential surface of the hub 5 takes a proper value in relation to a space between outer ring raceways provided in double rows on an inner circumferential surface of the outer ring 4, a desired preload (of a proper value) is applied to the rolling elements 6, 6a. In addition, the inner ring 12 may be fixed to the hub main body by forming a clamping portion by plastically deforming an end portion of the hub main body 11 radially outwardly, in place of the nut. Additionally, the outer inner ring raceway may be formed on an inner ring which is separate from the hub 5.

An encoder 15 made of a magnetic sheet is fixedly fitted on an outer circumferential surface of an intermediate portion of the hub 5. A plurality of V-shaped through holes 20, 20 are formed in an intermediate portion of the encoder 15 in an axial direction thereof in such a manner as to be spaced apart from each other at regular intervals with respect to a circumferential direction.

A mounting hole 12a is formed in an intermediate portion of the outer ring 4 in an axial direction thereof in a state in which a communication is established between an inner surface and an outer surface of the outer ring 4. A sensor unit 30 in which four sensors 17a to 17d are built is inserted into the mounting hole 12a from a radially outside to a radially inside. In the sensors 17a to 17d, detecting portions of the sensors 17a, 17b are exposed from a distal end face (an upper end face in FIG. 1) of a holder 31 of the sensor unit 30, respectively, and closely face an outer circumferential surface (a detectable surface) of the encoder 15. The positions where the detecting portions of the sensors 17a, 17b face the outer circumferential surface of the encoder are made to be the same with respect to a circumferential direction of the encoder 15. In addition, the encoder 15 and the sensors 17a, 17b are installed such that top portions (bent portions) of the V-shaped through holes 20, 20 are positioned right in a center between the detecting portions of the sensors 17a, 17b in a state in which no axial load is applied between the outer ring 4 and the hub 5. In addition, since the encoder 15 is simply made of the magnetic material, permanent magnets are incorporated in the sensors 17a, 17b.

In a state in which no axial load is applied between the outer ring 4 and the hub 5, the detecting portions of the sensors 17a, 17b face portions on the encoder 15 which deviate equidistantly in the axial direction of the encoder 15 from the angled portions of the V-shaped through holes 20, 20. Consequently, phase of output signals of the sensors 17a, 17b coincide with each other.

On the other hand, when an axial load is applied on the hub 5 to which the encoder 15 is fixed, the detecting portions of the respective sensors 17a, 17b face portions on the encoder 15 which are different with respect to the deviation from the angled portions of the V-shaped through holes 20, 20 in the axial direction of the encoder. Consequently, the phases of output signals of the sensors 17a, 17b also deviate from each other. The larger the axial load, the larger the deviation in phase of detection signals of the sensors 17a, 17b. Consequently, a relative displacement between the outer ring 4 and the hub 5 with respect to the axial direction is obtained by a phase difference of the detection signals of the sensors 17a, 17b, and the load applied between the outer ring 4 and the hub 5 can be obtained based on the relative displacement.

In addition, the sensors 17c, 17d are exposed from respective side surfaces (both right and left side surfaces in FIG. 1) of the distal end portion of the holder 31 of the sensor unit 30, respectively, and are used to obtain a preload of the respective rolling elements 6, 6 which has an influence on a zero point and a gain which are used when obtaining an axial load from a axial displacement. Namely, the sensors 17c, 17d are used to obtain revolution speeds of the respective rolling elements 6, 6, so as to calculate a preload applied to the rolling elements 6, 6 from the revolution speed so obtained. Revolution speed detecting encoders 23a, 23b are installed respectively on surfaces opposite to each other of a pair of cages 22a, 22b which retain the respective rolling elements 6, 6 which are disposed in double rows in order to obtain the revolution speed. Magnetic characteristics of side surfaces opposite to each other of the respective revolution speed detecting encoders 23a, 23b, which are detectable surfaces thereof, are made to change alternately and at regular intervals with respect to a circumferential direction. Consequently, output signals of the sensors 17c, 17d changes with a frequency proportional to the revolution speeds of the respective rolling elements 6, 6 (an inversely proportional cycle), and the revolution speeds of the respective rolling elements 6, 6 are obtained based on this frequency (or the cycle).

In addition, magnetic detection elements such as hall IC's, hall elements, MR elements, and GMR elements are built in the detecting portions of the sensors 17a to 17d.

In the first embodiment, revolution speeds nca, ncb of the respective rolling bearings 6, 6 are obtained based on output signals of the sensors 17c, 17d, and a preload Fo to the respective rolling elements 6, 6 is obtained from the revolution speeds na, nc and a rotational speed ni of the hub 5. Namely, since a contact angle α of the respective rolling elements 6, 6 changes according to the preload Fo (the larger the preload Fo, the larger the contact angle α) and the revolution speeds nca, ncb change in association with change in contact angle α, the preload Fo is obtained from the revolution speeds nca, ncb. In addition, since the same preload Fo is applied to the respective rolling elements 6, 6, in order to obtain the preload Fo, the revolution speeds nca, ncb of the rolling elements 6, 6 in both the rows do not always have to be obtained. Additionally, the rotational speed ni of the hub 5 can be obtained based on a detection signal of the sensor 17a (or 17b), the detecting portions of which being made to closely face the outer circumferential surface (the detectable surface) of the encoder 15. Namely, the frequency of the detection signal of the sensor 17a (or 17b) is proportional to the rotational speed ni of the hub 5 and the cycle is proportional to the rotational speed ni. Then, a method will be described for obtaining the preload Fo from the revolution speed nc of the rolling elements 6, 6 in either of the rows and the rotational speed ni of the hub 5.

The revolving sped nc can be generally expressed by Equation (1) below.

$$nc=\{1-(d\cdot\cos\alpha)/D\}(ni/2)+\{1+(d\cdot\cos\alpha)/D\}(no/2) \qquad (1)$$

In Equation (1), D denotes a pitch circle diameter of the rolling elements 6, 6, d a diameter of the rolling elements 6, 6, and no denotes a rotational speed of the outer ring 4. In the first embodiment, since the hub 5 rotates, while the outer ring 4 does not rotate (no=0), the revolution speed nc is expressed by Equation (2) below.

$$nc=\{1-(d\cdot\cos\alpha)/D\}(ni/2) \qquad (2)$$

In Equation (2), the pitch circle diameter D of the respective rolling elements 6, 6 and the diameter d thereof is given (bearing specifications) and differ little from a rolling bearing unit to a rolling bearing unit, and they are also not such values as to change over long-time usage.

Figure 2:
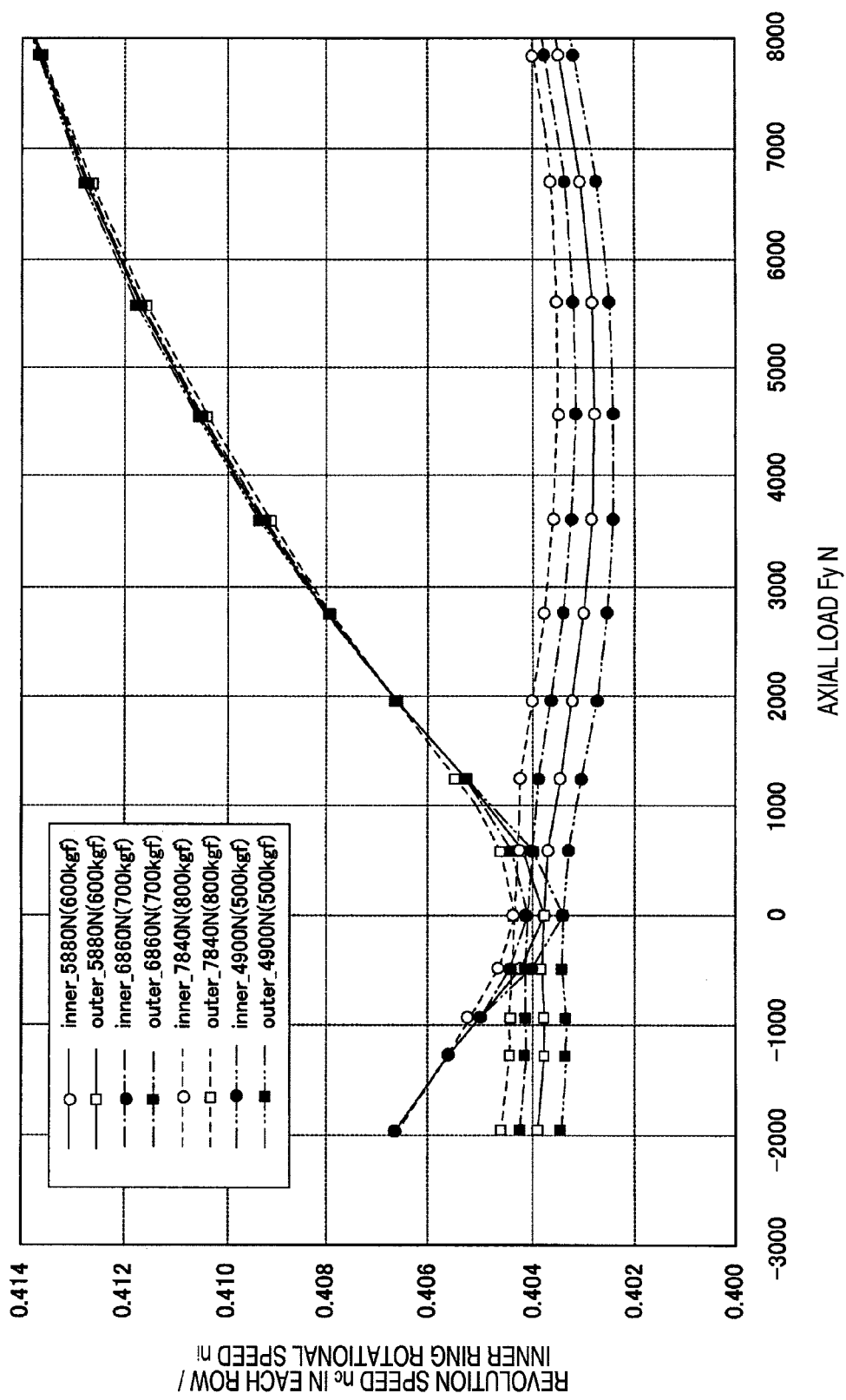
FIG. 2 is a diagram showing an influence of a preload and an axial load on a revolution speed of rolling elements.

Consequently, the revolution speed nc is determined by the contact angle α of the respective rolling elements 6, 6 and the rotational speed ni of the hub 5. In addition, although this contact angle α changes depending on loads in respective directions, the contact angle α is determined almost solely by the preload Fo under such a condition that no axial load is applied. FIG. 2 shows a relationship between an axial load Fy and a ratio (nc/ni) of the revolution speed nc of the rolling elements 6, 6 to the rotational speed ni of the hub 5 when the preload Fo is changed at intervals of 980N (1000 kgf) between 4900 n (500 kgf) to 7840N (800 kgf). As is obvious from FIG. 2, the revolution speed of the rolling elements 6, 6 and the ratio of the revolution speed of the rolling elements 6, 6 to the rotational speed ni of the hub 5 change depending upon the preload Fo.

Note that in the axial load Fy expressed on the lateral axis in FIG. 2, an axial load Fy directed towards a center side in a vehicle width direction (inwards, inner side) is regarded as positive (+). As is obvious when looking at FIG. 2 by taking this into consideration, the revolution speed nc of the rolling elements 6, 6 on a side which bears the axial load Fy changes more largely as the axial load Fy changes than the revolution speed nc of the rolling elements 6, 6 on a side which bears no axial load Fy. In contrast to this, the revolution speed nc of the rolling elements 6, 6 on the side which bears no axial load Fy changes more largely as the preload Fo changes than the revolution speed nc of the rolling elements 6, 6 on the side which bears the axial load Fy. In the case of the motor vehicle wheel supporting rolling bearing unit, the value of axial load Fy applied towards the center side of the vehicle width direction becomes larger than the value of axial load Fy applied outwards (the outer side) in the vehicle width direction. Note that this is premised on that the preload Fo remains applied also to the rolling elements 6, 6, on the side which bears no axial load Fy.

Figure 3:
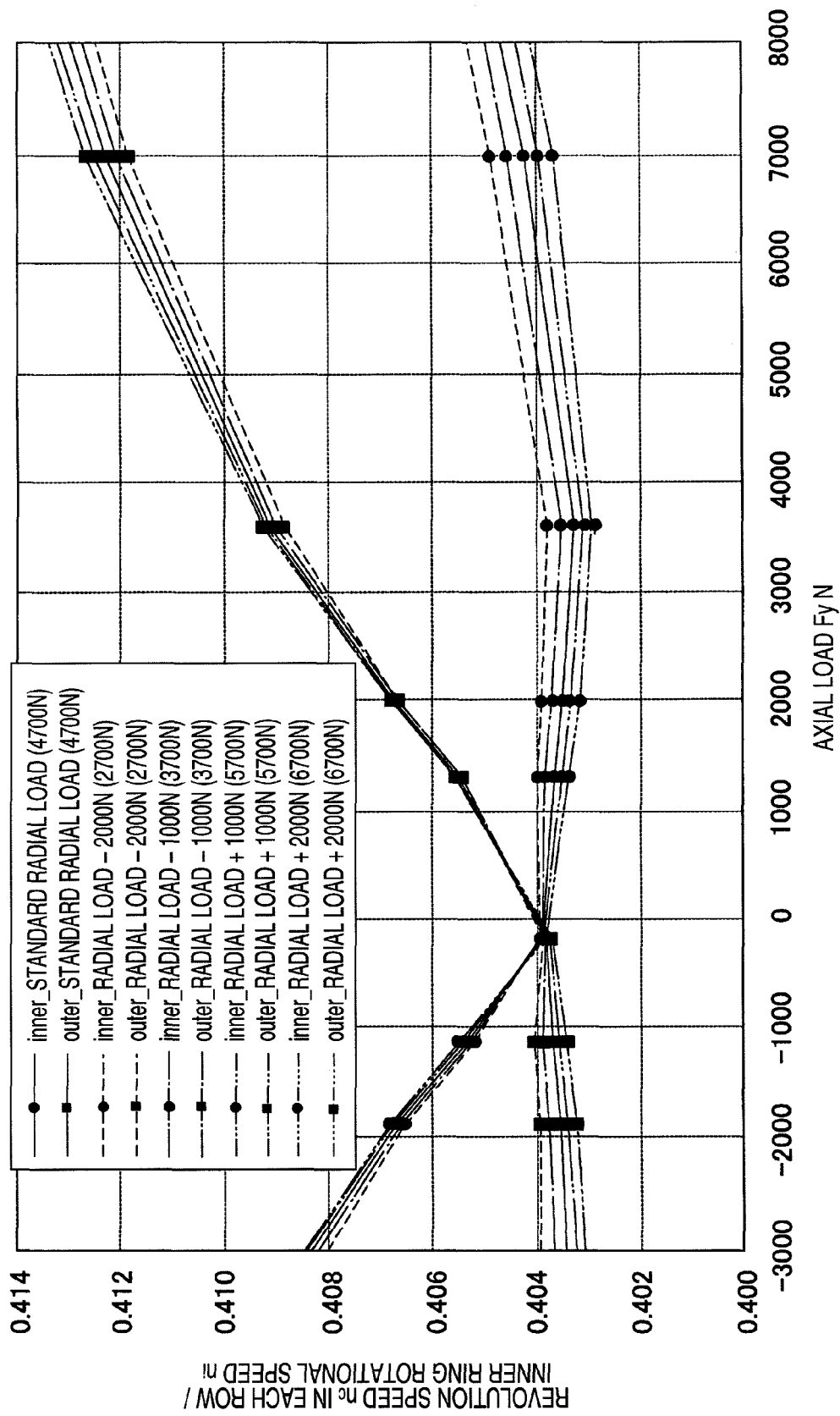
FIG. 3 is a diagram showing an influence of a radial load and the axial load on the revolution speed of the rolling elements.

However, the contact angle α also changes due to a radial load applied between the outer ring 4 and the hub 5. FIG. 3 shows a relationship between axial load Fy and a ratio (nc/ni) of the rolling speed nc of the rolling elements 6, 6 to the rotational speed ni of the hub 5, when a radial load Fz in a vertical direction is caused to change. As is obvious from FIG. 3, the contact angle α of the rolling elements 6, 6 also changes when the radial load Fz changes, as a result of which the revolution speed nc of the rolling elements 6, 6 changes. In a state in which no axial load Fy is applied, however, the change in revolution speed in association with the change in radial load Fz is small. Consequently, if a preload Fo is estimated after determining on the state where no axial load Fy is applied or the axial load applied is small and then obtaining a revolution speed nc in that state, an accurate estimated value with respect to preload Fo can be obtained.

Because of this, for example, a revolution speed nc is obtained while the vehicle is traveling straight ahead, and the zero point and gain characteristics for obtaining an axial load Fy from a axial displacement are corrected based on the revolution speed. In order to implement the correction of the zero point and gain characteristics for obtain an axial load Fy while the vehicle is traveling straight ahead, a preload Fo to the respective rolling elements 6, 6 is obtained based on a ratio nca/ni (ncb/ni) of the revolution speed nca (ncb) of the rolling elements 6, 6 in either or both the rows to the rotational speed ni of the hub 5. Namely, since it is considered that almost no axial load Fy is applied on the rolling bearing unit while the vehicle is traveling straight ahead, the correction of the zero point and gain characteristics is implemented while the vehicle is traveling straight ahead.

In addition, whether or not the vehicle is traveling straight ahead can be determined based on information from a steering angle sensor, an acceleration sensor, a yaw rate sensor and the like which are equipped on the vehicle. When the vehicle is traveling straight ahead, any of the steering angle, lateral acceleration and yaw rate becomes almost zero. Consequently, whether or not the running state of the vehicle is in a state in which the vehicle is traveling straight ahead is determined based on one or more sensor signals selected from the aforesaid sensors. Specifically, if any or all the information obtained from the selected sensors are equal to or less than threshold values, it is determined that the vehicle is traveling straight ahead. Note that even though the steering angle takes a certain constant value, since an axial load generated changes depending upon running speeds, it is desired that threshold values based on detection signals of the steering angle sensor and the yaw rate sensor are made to be variable according to vehicle speeds. In addition, it is preferable from the point of view of the implementation of accurate correction that the zero point and the gain characteristics are corrected when the change in running speed is small, that is, the vehicle is running at constant speeds or in a state close thereto. Whether or not the vehicle is traveling at constant speeds may be determined from rotational speeds of wheels or may be determined from a detection value of the acceleration sensor for detecting an acceleration in front-and-rear directions. Furthermore, it is preferable that the correction of the zero point and the gain characteristics is implemented in a state in which the brakes are no applied. The reason for this is that when the zero point and gain characteristics are corrected in a state in which the brakes are applied, there is a possibility that a load at which a caliper presses a pad against a disk is exerted also on to the hub 5 to which the disk is fixed as an axial load.

In addition, whether or not the vehicle is traveling straight ahead can also be determined based on detection signals of sensors for detecting wheel speeds of the right and left wheels (the axial direction displacement measuring sensors 17a, 17b which are built in each rolling bearing unit). Namely, if wheel speeds of both the right and left wheels (to which the hubs 5 are fixed) are substantially equal, it can be estimated that the vehicle is traveling straight ahead. In this case, since whether the vehicle is traveling straight ahead is estimated by detection signals of the sensors 17a, 17b which are also used for calculation of axial load Fy, this estimation work is performed only in a processor for calculating an axial load Fy (without taking in any signal from the outside), so that the zero point and gain characteristics can be corrected.

In any case, if it can be observed that no axial load Fy is applied or a small axial load Fy is applied, as is obvious from FIG. 2, a preload Fo can be obtained. Namely, a preload Fo can be obtained from the revolution speed ratio {(the revolution speed nc of the respective rolling elements 6, 6)/(the rotational speed of the hub 5)} in a state in which the axial load Fy on the lateral axis is 0. In addition, the characteristics shown in FIG. 2 are obtained in advance from experiments or calculations and are then made to be stored in a controller as a map or the like. In this case, the revolution speed nc to be used may be either of the revolution speeds nca, ncb of the rolling elements 6, 6 in the respective rows. Alternatively, a preload Fo can also be obtained based on a ratio of a sum of the revolution speeds of the rolling elements 6, 6 in the respective rows to the rotational speed of the hub 5 {(nca+ncb)/ni}. In addition, it is preferable to eliminate as much effect by the radial load in a front-and-rear direction as possible. Then, corrections with respect to preload Fo are preferably implemented in a state in which throttle opening is small, or throttle opening is constant, or furthermore, the brakes are not applied (the accelerator pedal is not depressed, the brake hydraulic pressure is 0, or the like).

Furthermore, the implementation of the preload Fo obtaining operation is not limited to the state in which the axial load Fy is 0 or small and hence, an axial load Fo can be obtained in a state in which the axial load is being applied. However, as this occurs, as is obvious from FIG. 2, it is preferable from the point of view of ensuring the accuracy of a preload Fo obtained to obtain a preload Fo from the revolution speed nca, ncb of the rolling elements 6, 6 on the side which bears no axial load Fy (the inner side in the case of a positive load, the outer side in the case of a negative load). In addition, when it is not possible to determine which of the inner side row and the outer side row is the row to which the axial load Fy is applied, also as is clear from FIG. 2, even though a preload Fo is obtained using the revolution speed of the row of which the revolution speed is slower than the other, a preload Fo can be obtained with good accuracy as obtained using the revolution speed of the row on the side to which no axial load Fy is applied. In either case, as has been described before, this is premised on that the preload Fo applied to the respective rolling elements 6, 6 remains.

Namely, as is shown in FIG. 2, in a state in which a positive axial load Fy is applied, a change in revolution speed nc due to this axial load Fy is small (an error in revolution speed due to the axial load Fy is small) on the inner side row to which that axial load Fy is not applied. In contrast to this, in a state in which a negative axial load Fy is applied, a change in revolution speed nc due to this axial load Fy is small (an error in revolution speed due to the axial load Fy is small) on the outer side row which does not bear that axial load Fy. Because of this, a preload Fo is obtained by making use of the revolution speed nc of the row in which the contact angle α is small due to no axial load Fy being applied and of which the revolution speed is smaller than the other. On the contrary, in the outer side row in a state in which the positive axial load Fy is applied and the inner side row (or the row of which the revolution speed is faster than the other) in a state in which the negative axial load Fy is applied, since the variation in revolution speed relative to the change in this axial load is large, if there exists an error in a measured value of this axial load Fy (if the preload Fo is unknown, the error inevitably becomes large), an error is also produced with respect to measuring a preload Fo.

Thus, the case has been described where the axial load Fy applied between the outer ring 4 and the hub 5 is measured. In addition to this, the invention can also be applied to a case where a radial load Fz, Fx (in the vertical direction or the front-and-rear direction) is measured. When measuring a radial load Fz, Fx, a side of the encoder in the axial direction is made to constitute the detectable surface thereof, and V-shaped through holes like those shown, for example, in FIG. 1 are provided on the detectable surface such that sloping directions relative to a radial direction are made opposite to each other on an inner half portion and an outer half portion. Furthermore, the invention can also be applied to a case where loads in a plurality of directions (for example, axial load Fy+radial load Fz in the vertical direction, axial load Fy+radial load Fx in the front-and-rear direction, axial load Fy+radial load Fz in the vertical direction+radial load Fx in the front-and-rear direction, and the like) are obtained. Where measuring loads in the plurality of directions, a preload Fo can be estimated while taking into consideration loads in the other directions in addition to the axial load Fy.

In addition, in the first embodiment, in order to determine (compare) a reduction (a change) in preload Fo due to deterioration with age, information on preload Fo is stored in a memory of the processor for obtaining a load based on displacement. As the memory, non-volatile memories such as EEPROM and flash memories (no data is deleted even when the power supply is turned off) are used. Then, a preload Fo in an initial state of a rolling bearing unit is stored in the memory, and when a newly obtained preload Fo differs from that in the initial state, the zero point and gain characteristics for obtaining a load from displacement are corrected based on the newly obtained preload Fo. As a result, a load is obtained with good accuracy based on the displacement. In addition, when correcting the zero point and gain characteristics based on a change in preload Fo, a threshold value for a variable value (a changeable portion) of preload Fo is set, so that the correction may be made to be implemented only when the threshold value is surpassed. In addition, every time a preload Fo is obtained newly, the value of the preload Fo so obtained is written on the memory, so as to make a determination on a variation in preload Fo (for example, a warning may be made to be given when there is a drastic fall in preload).

As to the detection of revolution speed nc, the invention is not limited to the construction in which the revolution speed detecting encoders 23a, 23b are used. For example, the revolution speed nc of the respective rolling elements 6, 6 can be obtained by detecting the frequency zfc (revolving frequency fc×the number of rolling elements z) of vibrations generated in association with the revolving motion of the respective rolling elements 6, 6. A rough value of the revolution speed nc is obtained from the initial contact angle α using Equation (1) described above if the rotational speed ni of the hub 5, which is measured as has been described before, is known. In addition, since the number of rolling elements 6, 6, is already known, a rough value of the frequency zfc of the vibrations generated in association with the revolving motion of the respective rolling elements 6, 6, is obtained. Then, a detection signal of a vibration sensor for detecting the vibration of the outer ring 4 is processed by a band pass filter (BPF) which passes frequencies in the vicinity of the rough value so as to extract a frequency zfc component, thereby making it possible to obtain an accurate value with respect to the frequency zfc of vibrations generated in association with the revolving motion of the respective rolling elements 6, 6.

Specifically, an accurate value with respect to the frequency zfc of vibrations generated in association with the revolving motion of the respective rolling elements 6, 6 can be extracted by subjecting displacement information which detects a relative displacement between the outer ring 4 and the hub 5 (information regarding a ratio of a phase difference between detection signals of a pair of sensors to one cycle of both the sensors, or information regarding a duty ratio of a detection signal of one sensor), an output signal indicating the frequency of vibrations detected by a vibration sensor installed separately and a signal indicating magnetostriction effect or strain output information of a strain gauge to the processing by the BRF which passes frequencies in the vicinity of the frequency zfc. In addition, before the processing by the BPF, the frequency is divided by the number z of rolling elements to obtain a revolving frequency fc (or directly measuring an fc), so that a preload Fo can also be obtained from the revolving frequency fc so obtained.

When detecting the respective frequencies zfc, fc, in order to cause the respective frequency components zfc, fc to be detected more remarkably, it is effective to provide a phase difference to the respective rolling elements 6, 6 (the diameter of any one of the rolling elements 3 is made slightly larger than the diameter of the other rolling elements 6, 6). In addition, in order to facilitate the discrimination between the inner row and the outer row, the frequency components zfc (fc) of both the rows can be made different from each other. When changing the frequency zfc component of them, one or more elements selected from contact angle, diameter of the rolling elements, pitch diameter of the respective rolling elements and the number of rolling elements are made different from each other between both the rows (however, in the case of the frequency fc, the number of rolling elements is excluded).

In addition, only the revolution speed detecting encoder (one or both of the revolution speed detecting encoders 23a, 23b shown in FIG. 1) can be added (no exclusive sensors 17c 17d for detecting revolution speeds are provided). In this case, the revolution speed detection encoder so added and the sensors (sensors 17a, 17b shown in FIG. 1) for detecting a relative displacement between the outer ring 4 and the hub 5 are disposed close to each other so as to induce a magnetic interference. Then, based on the magnetic interference, information indicating the revolution speeds of the respective rolling elements 6, 6 is mixed into detection signals of sensors (19a, 19b) for detecting a relative displacement between the outer ring 4 and the hub 5. Then, the output signals into which the information indicating the revolution speeds is mixed are subjected to a processing by a BPF which passes a frequency of fc×the number of pulses of the revolution speed detecting encoder, so as to also obtain a revolution speed.

Figure 4:
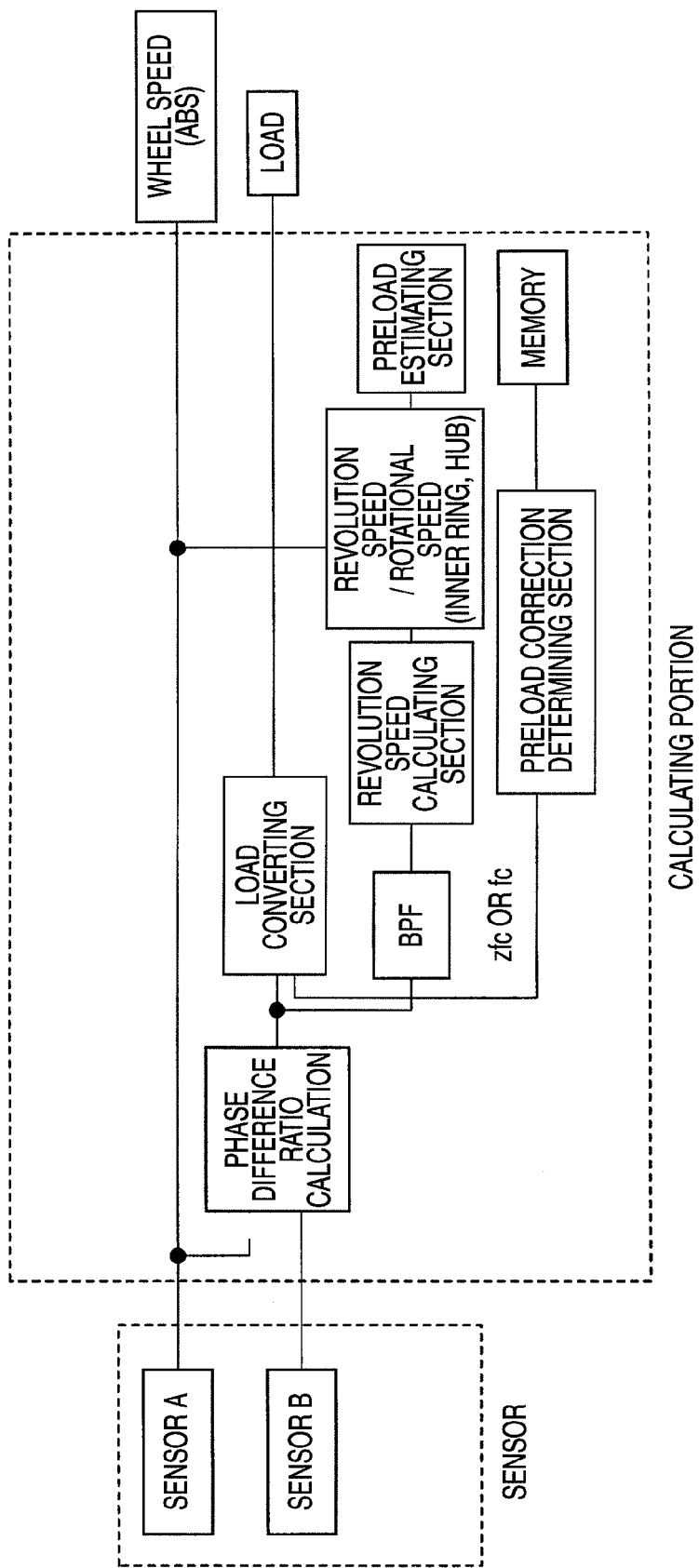
FIG. 4 is a block diagram showing a processing circuit in the first embodiment.

FIG. 4 shows one example of a processing circuit in the first embodiment. The processing circuit shown in FIG. 4 includes a calculating portion which is an example of a preload calculating means according to a first embodiment. In the processing circuit shown in FIG. 4, firstly, a relative displacement (a phase difference/one cycle=a phase ratio) between the outer ring 4 and the hub 5 (refer to FIG. 1) is measured based on detection signals of a pair of sensors A, B. Then, a load applied between the outer ring 4 and the hub 5 is obtained based on a signal indicating a phase difference ratio, and the signal indicating the phase difference ratio is processed by the BPF, so as to extract a revolving frequency zfc (or fc) to thereby obtain a revolution speed nc of the respective rolling elements 6, 6 (refer to FIG. 1). In addition, a rotational speed ni of the hub 5 is obtained from an output signal of either of the pair of sensors, which is the sensor A, or an output signal of a generally used conventional ABS sensor. Then, a ratio (nc/ni) of the revolution speed nc to the rotational speed ni of the hub 5 is calculated, and a preload Fo is obtained which is applied to the respective rolling elements 6, 6. The value of the preload Fo which is obtained in this way is stored in the memory provided in the processor for calculating a load, and whether to implement a correction is determined by comparing the preload so stored with the initial preload or the previously estimated preload in a preload correction determining circuit. Then, if it is determined that there exists a large variation in preload Fo, a load converting section performs a calculation to obtain a load from the phase difference ratio using a zero point and gain characteristics which are obtained from the preload Fo obtained newly. By adopting this configuration, deterioration of the preload Fo with age can be dealt with, whereby a rolling bearing unit with a load measuring device can be realized which can obtain a load with good accuracy irrespective of the deterioration of the preload Fo with age. Note that the memory in the processing circuit shown in FIG. 4 can store not only the preload Fo so obtained but also the zero point and gain characteristics which are obtained from the preload Fo and the initial preload.

In the construction shown in FIG. 1, detecting portions of the pair of sensors 17c, 17d are made to face, respectively, two positions on the outer circumferential surface of the encoder 15 made of the magnetic sheet metal which are spaced apart in the axial direction. However, the first embodiment can be applied to not only this construction but also other ones. For example, a direction and amount of a change in the axial direction between the outer ring 4 and the hub 5 may be obtained according to a duty ratio of an output signal of the encoder which changes in association with the change in the axial direction between the outer ring 4 and the hub 5. In this case, for example, an encoder 15a shown in FIG. 18 may be used. Additionally, an encoder 15b, made of a permanent magnet and shown in FIG. 19, may be used. With these constructions, when the preload changes, a load cannot be obtained accurately based on the direction and amount of the change in the axial direction. In contrast to this, if the correction with respect to preload in the first embodiment is implemented, the deterioration in load measuring accuracy based on the direction and amount of the change in the axial direction can be prevented. In addition, also in a case where the encoder in which magnetized areas on an outer circumferential surface of an encoder main body made of a permanent magnet are formed into a trapezoidal shape (boundaries between S poles and N poles which are adjacent in a circumferential direction are inclined with respect to the axial direction) is combined with one sensor, it is possible to prevent the deterioration in accuracy with which a load is measured based on the direction and amount of the change in the axial direction by the change in preload in a similar manner. In addition, the combination of the encoder and the sensor is not limited to such a magnetic detection type. For example, a sensor of eddy current type and an optical sensor also can be used. Furthermore, as to the construction of the rolling bearing unit, the construction is not limited to the ball bearing unit shown in the figures, and hence, a double row tapered roller bearing unit can also be adopted. In addition, the sensors can be disposed at an inner end portion of the outer ring, in addition to the portion lying between the outer ring raceways.

Second Embodiment

Figure 20:
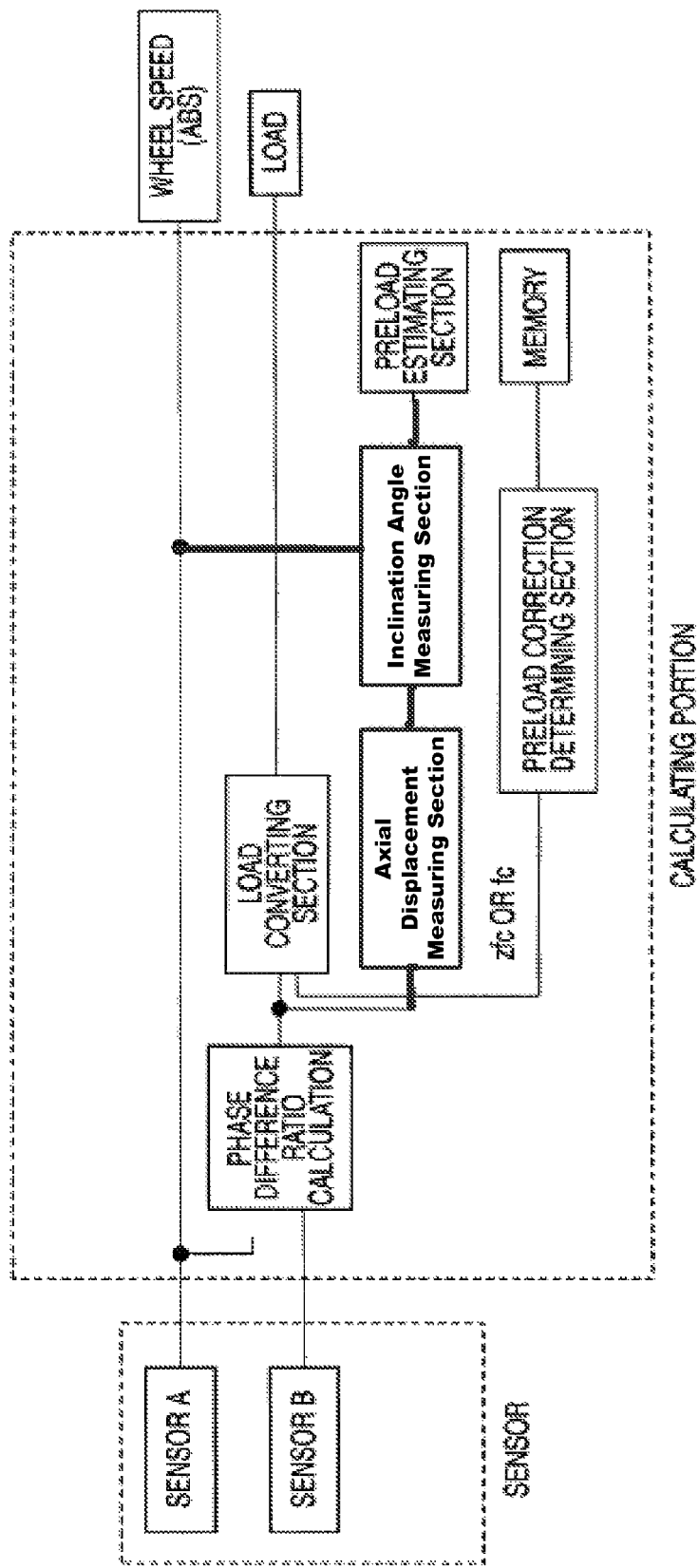
FIG. 20 is a block diagram showing a processing circuit in the second embodiment.

In the first embodiment, the change in revolution speed of the rolling elements is measured based on the change in preload, and the preload is obtained based on the change in revolution speed. The preload measurement like this is effective in a case where the respective rolling elements are balls in which the change in revolution speed based on the change in preload is large. However, if the rolling elements are tapered rollers in which the change in revolution speed based on the change in preload is small, the measuring accuracy with respect to preload to the rolling elements is deteriorated. According to a second embodiment of the invention, a preload applied to the respective rolling elements can be obtained without relying upon the revolution speed of the respective rolling elements. Because of this, a preload can be obtained with good accuracy not only when the rolling elements are balls but also when the rolling elements are rolling elements in other forms such as cylindrical rollers, tapered rollers and spherical rollers. This feature will be described by reference to FIGS. 5 to 11. FIG. 20 shows one example of a processing circuit in the second embodiment. The processing circuit shown in FIG. 20 includes a calculating portion similar to the calculating portion of FIG. 4. However, in FIG. 20, the BPF, a revolution speed calculating section and a revolution speed/rotational speed section have been replaced by an axial displacement measuring section and an inclination angle measuring section.

When an eccentric load such as an axial load applied to a position which deviates from a rotational center in a radial direction or a radial load applied to a position which deviates from a center of the rows of rolling elements is applied on a double row rolling bearing unit, both outer and inner bearing members which make up the double row rolling bearing unit are displaced relatively (move to go away from or come nearer to each other) in a direction in which the load is applied while inclining their own center axes. For example, in the case of a motor vehicle wheel supporting double row rolling bearing unit 1 shown in FIG. 5, an axial load is applied on a position which deviates (is offset) from centers of an outer bearing ring member 4 and an outer bearing ring member 5 in a radial direction from an abutment portion (a ground contacting surface) between a wheel (tire) 2 and a road surface 3 as an eccentric load. The bearing ring members 4, 5 are displaced relatively by this eccentric load.

In this case, the axial load is applied on the wheel supporting double row rolling bearing unit 1 as a load (force) in which a (pure) axial load applied in the axial direction of the bearing ring members 4, 5 and a moment which constitutes a force to inline the center axes of the bearing ring members 4, 5 relative to each other are combined. Consequently, a displacement in the (pure) axial direction and an inclination of the center axes happen simultaneously between both the bearing ring members 4, 5. The axial displacement and the inclination of the center axes like these become remarkable as a preload applied to rolling elements 6, 6 which make up the wheel supporting double row rolling bearing unit 1 becomes small. Namely, as the preload applied to the rolling elements 6, 6 is decreased, the rigidity of the wheel supporting double row rolling bearing unit is decreased, and the displacement of the bearing ring members 4, 5 in the axial direction and the inclination angle of the center axes, which are based on the eccentric load, become large. On the contrary, as the preload applied to the rolling elements 6, 6 is increased, the rigidity of the wheel supporting double row rolling bearing unit is increased, and the displacement of the bearing ring members 4, 5 in the axial direction and the inclination angle of the center axes, which are based on the eccentric load, become small.

However, the amounts of changes in the displacement of the bearing ring members 4, 5 in the axial direction and the inclination angle are not the same. For example, when comparing an amount of increase in the axial displacement with an amount of increase in the inclination angle, both the increases resulting when the preload is decreased, the amount of increase in the axial displacement becomes more remarkable. This is because the direction in which the preload is applied (a pressing direction when imparting this preload) coincides with the axial direction. Namely, the reduction in preload links directly with the increase in the axial displacement, but the reduction in preload does not link directly with the increase in the inclination angle. On the contrary, the increase in preload links directly with the reduction in the axial displacement, but the increase in preload does not link directly with the reduction in the inclination angle.

Figure 5:
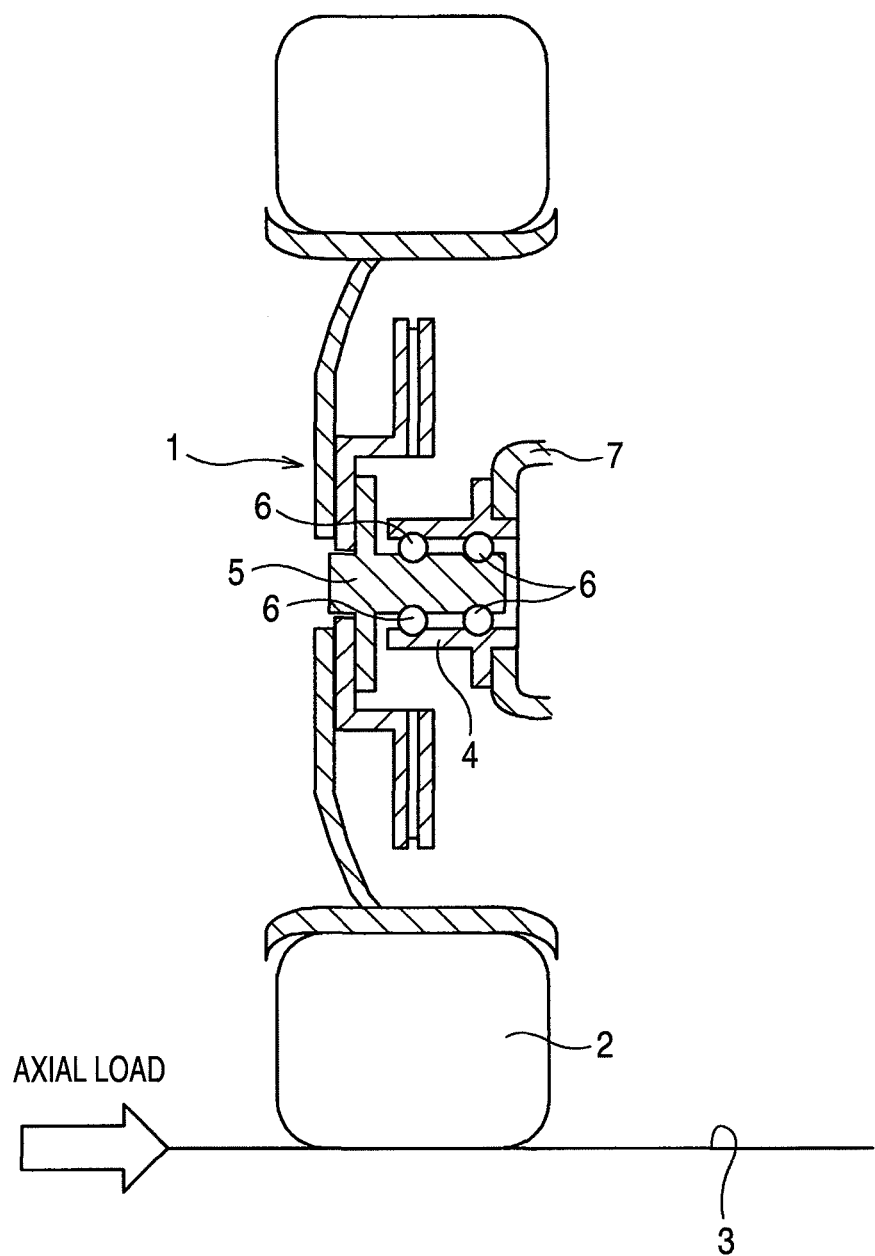
FIG. 5 is a schematic sectional view showing an example of an assembled condition of a wheel supporting double row rolling bearing unit for explaining a second embodiment of the invention.
Figure 6A:
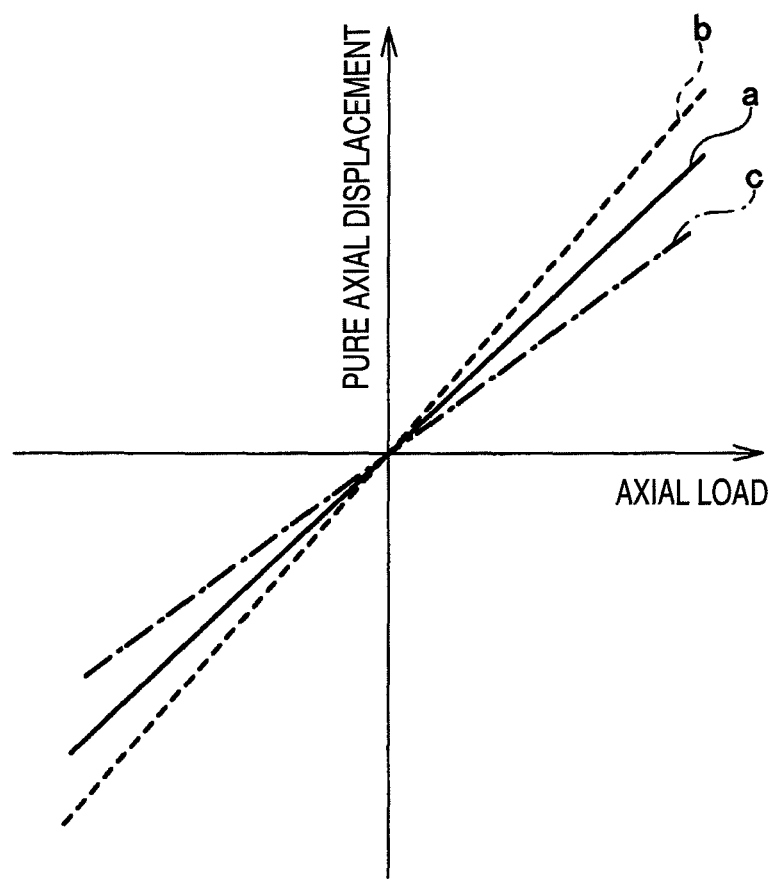
FIG. 6A is a diagram showing a relationship between the axial load, an axial displacement between an outer bearing ring member and an inner bearing ring member and the preload.
Figure 6B:
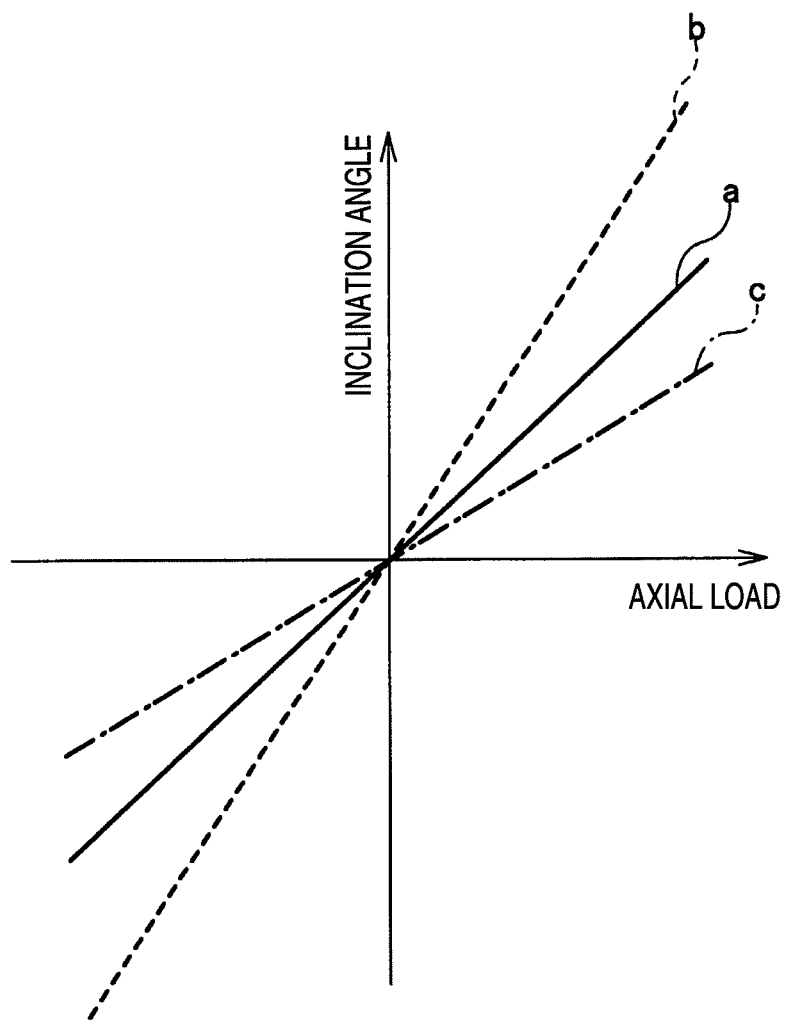
FIG. 6B is a diagram showing a relationship between the axial load, an inclination angle and the preload.

FIGS. 6A, 6B show relationships between a displacement in a (pure) axial direction between both the outer and inner bearing ring members 4, 5 and inclination angle which are both generated when the axial load is applied on the contact portion (ground contacting surface) between the wheel 2 and the road surface 3 in the construction shown in FIG. 5. FIG. 6A shows a relationship between the axial load and the axial displacement, and FIG. 6B shows a relationship between the axial load and the inclination angle. In FIGS. 6A, 6B, a solid line a denotes a relationship when a preload applied to the respective rolling elements 6, 6 is appropriate (standard), a broken line b denotes a relationship when the preload is too small, and a chain line c denotes a relationship when the preload is too large. As is obvious when comparing a difference (intersection angle) among the solid line a, the broken line b and the chain line c which are shown in FIG. 6A with a difference (intersection angle) among the solid line a, the broken line b and the chain line c which are shown in FIG. 6B, the extent to which the change is triggered by the change in preload is more remarkable in the axial displacement than in the inclination angle.

Figure 7:
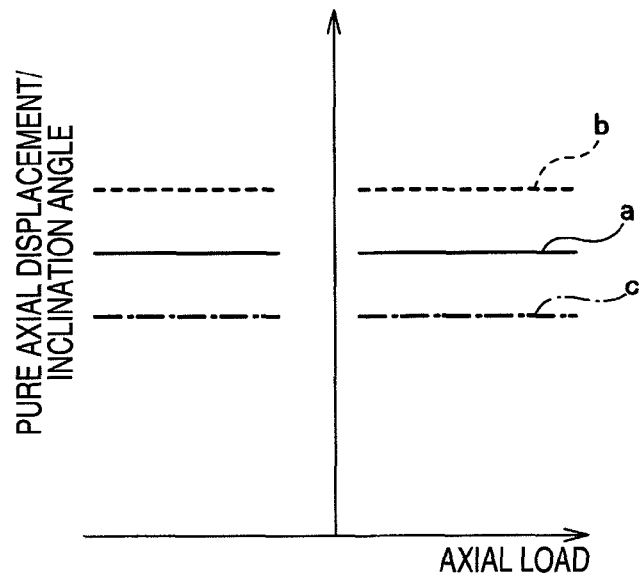
FIG. 7 is a diagram showing a relationship between the axial load, a ratio of the axial displacement to the inclination angle and the preload.

When taking this into consideration, a relationship shown in FIG. 7 is obtained when a ratio of the axial displacement to the inclination angle as a parameter, and it is understood that a preload applied to the respective rolling elements 6, 6 can be obtained irrespective of the magnitude of the axial load applied to the ground contacting surface. Namely, a axial displacement between the outer bearing ring member 4 and the inner bearing ring member 5 is obtained by an axial displacement measuring means, and an inclination angle of the center axes of both the outer and inner bearing ring members 4, 5 is obtained by an inclination angle measuring means, thereafter, a ratio of axial displacement to inclination angle being calculated. Following this, when this ratio is put in an vertical axis in FIG. 7, a preload applied to the respective rolling elements 6, 6 can be obtained. In addition, also in FIG. 7, as with FIGS. 6A, 6B, a solid line a denotes a relationship when a preload applied to the respective rolling elements 6, 6 is appropriate (standard), a broken line b denotes a relationship when the preload is too small, and a chain line c denotes a relationship when the preload is too large. In short, as is seen from the relationships among preload, axial displacement and inclination angle shown in FIGS. 6A to 7, the axial displacement and the inclination angle in these three elements are known, the preload, which is the remaining element, can be obtained. In the case of the double row rolling element bearing unit according to the second embodiment, a preload applied to the rolling elements of the double row rolling bearing unit is obtained by making use of the characteristics described above.

The ratio expressed by the vertical axis in FIG. 7 does not have to be obtained in case the axial load can be obtained by a separate sensor (adapted to implement a measurement without being affected by the preload) which is provided outside the double row rolling bearing unit, for example, a load sensor such as a load cell provided between the outer bearing ring member 4 and a knuckle 7 in FIG. 7 for measuring an axial load applied between the outer bearing ring member 4 and the knuckle 7. In this case, the value of the lateral axis in FIGS. 6A, 6B is given. Because of this, by finding a value measured by the load sensor in the lateral axis in FIGS. 6A, 6B, a preload is obtained from the axial displacement or the inclination angle of the center axes (one of the axial displacement and the inclination angle) of the outer bearing ring member 4 and the inner bearing ring member 5. As this occurs, as long as obtaining the preload is concerned, the necessity is obviated of measuring the other of the axial displacement and the inclination angle. However, in such a case, since the load sensor is required to obtain a preload, an increase in costs is called for due to parts costs and complexity in assembling work. In contrast to this, in the case of the second embodiment, since the preload is obtained by making use of the axial displacement and the inclination angle of the center axes of the outer bearing ring member 4 and the inner bearing ring member 5, the load sensor is not required.

Figure 8:
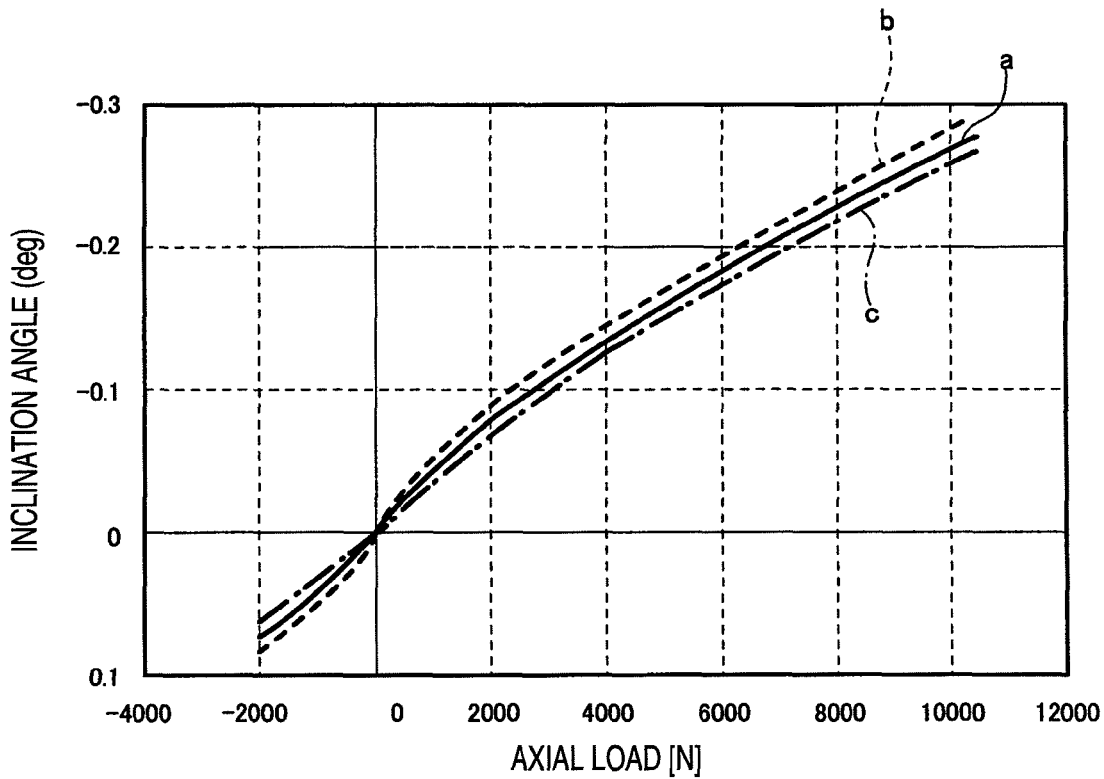
FIG. 8 is a diagram showing a relationship between the axial load input from a ground contacting surface and the inclination angle where the amount of preload is varied.
Figure 9:
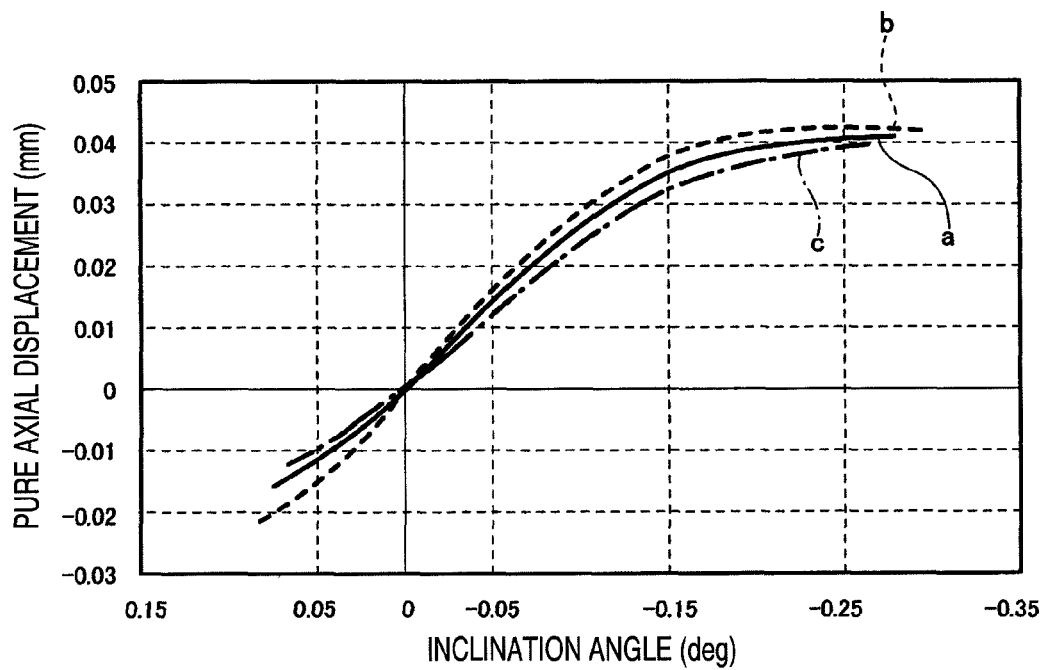
FIG. 9 is a diagram showing a relationship between the inclination angle and the axial displacement where the amount of preload is varied.
Figure 10:
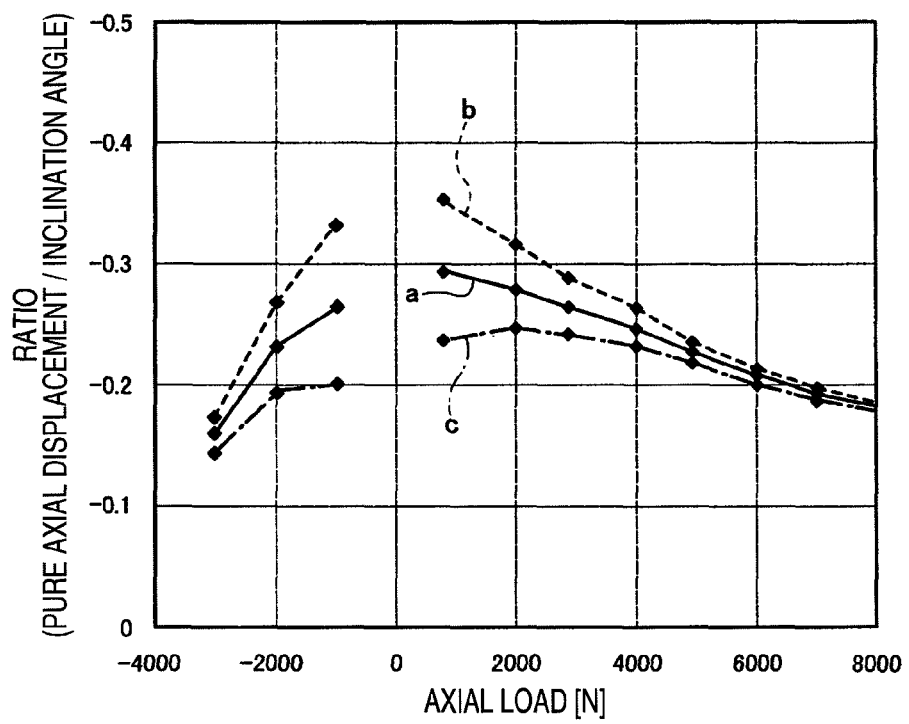
FIG. 10 is a diagram showing a relationship between the axial load, the ratio of the axial displacement to the inclination angle and the preload in an actual case.

In addition, FIG. 7 illustrates a basic idea when obtaining a preload applied to the respective rolling elements 6, 6 based on the axial displacement and inclination angle of the center axes of the outer bearing ring member 4 and the inner bearing ring member 5 according to the second embodiment, and what is shown is different from an actual state. Then, actual simulating calculations were performed on a wheel supporting double row rolling bearing unit as shown in FIG. 5 to obtain relationships between displacement in the (pure) axial direction, inclination angle, ratio of the displacement to the inclination angle and axial load applied between the outer bearing ring member 4 and the inner bearing ring member 5, and the results thereof are shown in FIGS. 8 to 10. In FIGS. 8 to 10, FIG. 8 shows a relationship between axial load inputted from the ground contacting surface and inclination angle when the amount of preload differs, FIG. 9 a relationship between inclination angle and axial displacement, and FIG. 10 a relationship between axial load and ratio of axial displacement to inclination angle. Also in FIGS. 8 to 10, as with FIGS. 6A to 7, a solid line a denotes a relationship when a preload applied to the respective rolling elements 6, 6 is appropriate (standard), a broken line b denotes a relationship when the preload is too small, and a chain line c denotes a relationship when the preload is too large. Although the ratio of axial displacement to inclination angle differs depending upon the amount of preload, this ratio also varies depending upon axial loads.

It is seen from the relationships shown in FIGS. 8 to 10 that in the actual case, it is not possible to obtain a preload applied to the respective rolling elements 6, 6 as long as an axial load applied between the outer bearing ring member 4 and the inner bearing ring member 5 is not obtained even though only the ratio of axial displacement to inclination angle is obtained. In contrast to this, according to the second embodiment, since the axial displacement and the inclination angle are obtained, an axial load can be obtained based on the axial displacement or the inclination angle so obtained. Namely, since the axial load and the ratio of axial displacement to the inclination angle are obtained simultaneously, a preload can be obtained irrespective of the relationships shown in FIGS. 8 to 10.

Note that one of objects to obtain the preload applied to the respective rolling elements 6, 6 resides in an attempt to correct the relationship (a relation or a map including zero point and gain) between the axial displacement or the inclination angle and the axial load in order to implement an accurate axial load calculation based on the axial displacement or the inclination angle. Consequently, at a glance, it appears to be contradictory to, in order to obtain a preload, use the axial load which takes this preload in consideration (which is obtained by making use of the relation or map which changes depending upon preloads). However, in reality, excluding such an extreme case that the wheel supporting double row rolling bearing unit 1 is damaged by an accident involving a collision, the theory to obtain a preload using axial load is established. This is because a main cause for change (reduction) in preload is deterioration with age as a result of usage over a long period of time and the deterioration speed is extremely slow. In this way, the operation to obtain a preload and the operation to obtain axial load by making use of preload are performed frequently, while preload changes very slowly and gradually. Consequently, the relationship (relation or map) between the ratio of axial displacement or inclination angle, which are used when calculating the axial load, to axial load is corrected frequently, and the axial load obtained by this relationship can be assumed to be an accurate value (which ensures an accuracy required to ensure the running stability). Because of this, by obtaining a preload by making use of the axial load, the preload can be obtained accurately.

Of course, if the speed at which the preload changes is fast relative to the frequency at which the operation to obtain an axial load, the operation to obtain a preload based on the axial load so obtained and the operation to correct the relationship between the axial displacement or the inclination angle to the axial load based on the preload so obtained are performed, the correction accuracy becomes a problem. However, the speed at which preload deteriorates with age is slow, and the extent to which preload deteriorates from a previous correcting operation to a correcting operation which follows it can almost be ignored. Consequently, excluding the extreme case described above, an error with respect to the correction of the relationship between the axial displacement or inclination angle to the axial load is extremely small, and it can be ignored especially from the accuracy of the control by making use of the axial load. On the contrary, if the preload obtained changes extraordinarily fast in consideration of the time that has elapsed or the mileage covered by the vehicle, it is considered that a certain abnormal thing has occurred which includes a case where the temperature of the wheel supporting double row rolling bearing unit rises so extraordinarily that the thermal expansion of the respective constituent members becomes remarkable or where the wheel supporting double row rolling bearing unit 1 is damaged. In such a case, the correction of the relationship between the axial displacement or the inclination angle to the axial load is not performed. Then, the occurrence of abnormality is informed to the driver or a main controller as required.

In addition, in the case of the wheel supporting double row rolling bearing unit 1, the aforesaid operation to obtain an axial load, operation to obtain a preload based on the axial load so obtained and operation to correct the relationship between the axial displacement or the inclination angle to the axial load based on the preload so obtained are performed at preset timings. For example, they are performed while the motor vehicle is running (every a short period of time), when the running speed is equal to or slower than a threshold value or when (immediately after) the ignition switch is switched off. In these opportunities, it is preferable from the point of view of increasing the frequency of correction of the relationship between the axial displacement or the inclination angle to the axial load, and grasping the preload accurately so as to calculate the axial load accurately that the operations are performed while the motor vehicle is running. In this case, however, it is inevitable that the load borne by the CPU for implementing the correction (which is premised on obtaining the axial load and the preload) becomes large.

On the other hand, in the case of an operation in which each of the operations is performed using as information source output signals of the sensors which change relative to a change in characteristics on the detectable surface of the encoder, the number of times at which the output signals change per unit time is reduced in a state in which the running speed is slow, giving an operational margin to the CPU compared with a case where the running speed is fast. In consideration of these situations, in the respective operations, the operation to obtain a preload based on the axial load obtained and the operation to correct the relationship between the axial displacement or the inclination angle, which are used when calculating the axial load based on the preload so obtained, to the axial load may be performed in a state in which the running speed becomes equal to or slower than a preset value which is preset by taking the processing capacity of the CPU into consideration. Furthermore, in order to save the load of the CPU further, in the respective operations, the operation to obtain an axial load and the operation to obtain a preload may be performed continuously, and the operation to correct the relationship between the axial displacement or the inclination angle, which are used when calculating the axial load based on the preload so obtained, to the axial load may be performed only when the ignition switch is switched off. Even in the case of either of the approaches being performed, information used to correct the relationship (which is affected by the value of the preload) for calculating an axial load based on the axial displacement or the inclination angle is stored in the memory such as EEPROM. In addition, following this, when the ignition switch is switched on, by making use of the latest corrected relationship, the calculation of an axial load based on the axial displacement or the inclination angle is started.

As is obvious from the description that has been made heretofore, in order to obtain accurately the preload applied to the rolling elements by the double row rolling bearing unit of the second embodiment, it becomes important to ensure the detection accuracy of the displacement in the (pure) axial direction and the inclination angle. Because of this, it is preferable to eliminate as many factors leading to a detection error of the axial displacement and the inclination angle as possible. As one of the factors leading to the detection error, a positional deviation of the sensors and the encoder with respect to the axial direction in association with thermal expansion and contraction is considered. However, as to the pair of sensors of which the detecting portions are made to face both the upper and lower end portions of the encoder, it is considered that the sensors are affected equally with respect to the positional deviation in the axial direction due to the cause described above and that errors of the same amount are produced in the respective sensors. In addition, the inclination angle of the center axes of the outer bearing ring member 4 and the inner bearing ring member 5 is proportional to a difference in axial displacement between the upper end portion and the lower end portion of the encoder which are measured, respectively, by the pair of sensors of which the detecting portions are made to face respectively the upper and lower end portions of the encoder. Consequently, an error based on thermal expansion or contraction is difficult to be included in the measured value of the inclination angle of the center axes. On the other hand, since the measured value of the displacement in the (pure) axial direction between the outer bearing ring member 4 and the inner bearing ring member 5 becomes an average of displacements in the axial direction which are measured by the pair of sensors of which the detecting portions are made to face respectively the upper and lower end portions of the encoder, the measured value is affected by the error due to thermal expansion or contraction.

In consideration of these situations, in order to prevent the inclusion of an error in the measured value of the axial displacement due to the reason described above, the axial load is obtained, for example, in a way described under (1) to (3) below.

(1) Information regarding the relative displacement between both the outer and inner bearing ring members 4, 5 which is used to operate an axial load is made to be the inclination angle of the center axes of both the bearing ring members 4, 5.

(2) A displacement in the (pure) axial direction between the outer bearing ring member 4 and the inner bearing ring member 5 in a state in which the operated axial load takes an arbitrary value (for example, zero) is stored.

(3) The displacement in the (pure) axial direction in this state is made to be a value resulting when the axial load takes an arbitrary value (for example, zero).

When the axial load is obtained in this way, even if the displacement in the (pure) axial direction between the outer bearing ring member 4 and the inner bearing ring member 5 is offset due to thermal expansion or contraction, a displacement (a true value) in the axial direction is obtained which excludes the effect by the thermal expansion or contraction. In addition, the ratio of axial displacement to inclination angle, which is expressed in the vertical axis in FIG. 10, is obtained accurately.

In addition, the effect of the error due to thermal expansion or contraction can be eliminated by obtaining an axial load applied between the outer bearing ring member and the inner bearing ring member based on the amount of state of at least one of the axial displacement and the inclination angle, correcting the axial relative displacement based on the inclination angle and obtaining a preload based on the axial relative displacement so corrected. As will be described later, it is desirable to perform the preload measuring operation in a state in which the axial load is applied stably. In addition, the temperature of the double row rolling bearing unit rises gradually even in a state in which the axial load is applied stably. However, a change in the temperature of the double row rolling bearing unit from a state prior to exertion of the axial load stays within an extent which can be ignored. For example, when the double row rolling bearing unit is a wheel supporting rolling bearing unit, although an axial load is produced immediately in association with the start of steering (operation of a steering wheel), the temperature of the wheel supporting rolling bearing unit only changes slowly and gradually. Consequently, the displacement in the (pure) axial direction which is affected by thermal expansion or contraction is corrected by making use of the inclination angle which is affected little by thermal expansion or contraction (a portion affected by temperature is cancelled), the accuracy at which the preload is measured can be improved by eliminating the effect on the measurement of preload (making the temperature conditions identical).

As a specific approach to realize a correction to eliminate the effect by thermal expansion or contraction, either of approaches which will be described under (A) and (B) below is considered.

(A) A portion of the displacement in the (pure) axial direction which is caused to change based on thermal expansion or contraction is corrected based on the inclination angle which is little affected by the thermal expansion or contraction. Specifically, in association with the axial load obtained based on the inclination angle, the axial displacement at that point in time is recorded as a value corresponding to the axial load in the memory of the preload calculating means as such that when the inclination angle is 0, the axial displacement is also made to be 0 (similar to the approach described under (1) to (3) above).

(B) A signal indicating the displacement in the (pure) axial direction is subjected to filtering by a high pass filter. For example, when the double row rolling bearing unit is the wheel supporting rolling bearing unit, and where the vehicle is in a running condition of "traveling straight ahead→being steered," "being steered→traveling straight ahead" or a lane change, the effect of thermal expansion or contraction which changes slowly and gradually can be eliminated. In addition, a preload can be obtained based on a relative amount of displacement in the (pure) axial direction between a case where the inclination angle is 0 and a state in which this inclination angle becomes a certain value.

With either of the approaches described under (A) and (B), irrespective of the displacement in the (pure) axial direction affected by thermal expansion or contraction, a preload can be obtained with good accuracy by eliminating the effect by thermal expansion or contraction.

In addition, it is preferable from the point of view of ensuring the measuring accuracy of preload to perform the operation to obtain, using FIG. 10, a preload from the axial load and the ratio of the axial displacement and the inclination angle in a portion where the ratio changes largely in association with a change in preload and a portion where the ratio changes a little in association with a change in axial load. Namely, when a preload is obtained in the portion where spaces between the respective lines a, b, c illustrated in FIG. 10 are narrow and the portion where these respective lines a, b, c slope steeply, even though there exists a slight error in the axial displacement, since the error related to the preload so obtained becomes large, it is preferable to obtain the preload in the portion where satisfies both the conditions. Specifically, since the gradients of the respective lines a, b, c are steep in an area where the axial load is smaller than −2000N (an axial load larger than an absolute value of 2000N is applied in an opposite direction to the arrow in FIG. 5), the area in question is avoided. In addition, since the change in the ratio of the axial displacement associated with a change in preload to the inclination angle is reduced in an area where the axial load exceeds +2000N, the area in question is also avoided. Furthermore, when the absolute value of the axial load is less than 1000N, elastically deformed states of the constituent members of the wheel supporting rolling bearing unit based on the axial load, which link with changes in the axial displacement and the inclination angle, are not stabilized, and since the axial load and the ratio of the axial displacement to the inclination angle cannot be obtained stably, this rear is also avoided. In consideration of these, it is preferable to implement a measurement of a preload in a range where the absolute value of the axial load is in the range of 1000N to 2000N. In particular, since the axial load and the ratio of the axial displacement and the inclination angle are obtained stably, it is most preferable to implement the measurement of a preload in the area of +1000N to 2000N where the axial load is applied in the direction indicated by the arrow in FIG. 5.

Figure 11:
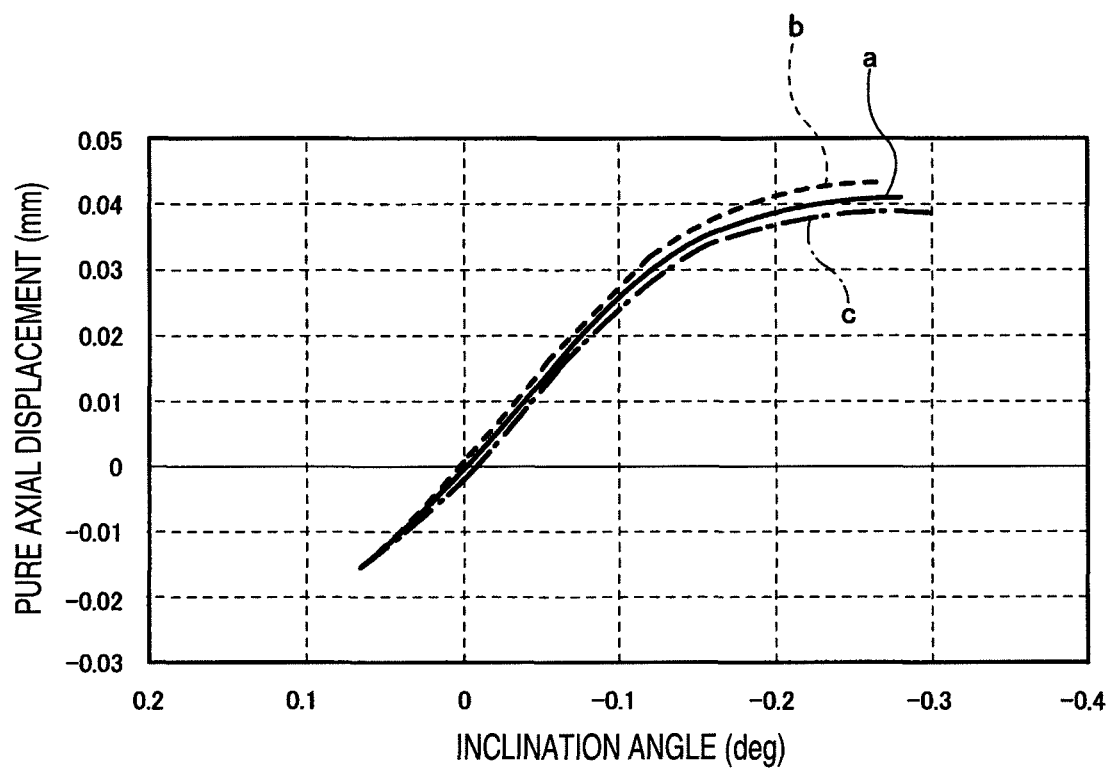
FIG. 11 is a diagram showing an influence of an offset amount on a relationship between the axial displacement and the inclination angle.

However, there exists a possibility that the input conditions of the axial load into the double row rolling bearing unit are changed due to replacement of tires, and when obtaining a preload without changing the zero point and the gains in the software installed in the preload calculating means even though the input conditions are changed, it is preferable to implement a measurement of a preload in the area where the axial load is negative (the axial load is applied in the opposite direction to the arrow in FIG. 5). Namely, when there is a possibility that a motor vehicle with the motor vehicle wheel supporting rolling bearing units is used in where they have much snow, different tires are used between summer and winter, and as this occurs, there is a case where wheels having different offset amounts {an axial distance between an outer surface (a left-hand side surface in FIG. 12 which will be described later) of the flange 13 and the center of the wheel} are used. On the other hand, the relationship between the axial displacement and the inclination angle differs depending upon offset amounts. FIG. 11 shows an effect imposed by the offset amount on the relationship between the axial displacement and the inclination angle. In FIG. 11, a solid line a indicates a case where the offset amount is appropriate (standard), a broken line b a case where the offset amount is offset to a positive side, and a chain line c a case where the offset amount is offset to a negative side.

As is obvious from FIG. 11, the effect imposed by the offset amount on the relationship between the axial displacement and the inclination angle is smaller where the negative (the opposite direction to the arrow in FIG. 5) axial load is applied than where the positive (the direction indicated by the arrow in FIG. 5) axial load is applied. The reason for this is as follows. Firstly, the reason that the relationship between the axial displacement to the inclination angle changes depending upon offset amounts is based on the fact that the relationship between the center of the wheel supporting rolling bearing unit (a central portion in the axial direction of the rolling elements 6, 6 which are disposed in double rows) and the center of the ground contacting surface deviates due to the difference in offset amount, as a result of which the inclination angle based on the radial load in the vertical direction changes. On the other hand, where the positive axial load is applied on the ground contacting surface, the radial load in the vertical direction based on a moment associated with the axial load is also applied in the positive direction, whereby the radial load in the vertical direction which is applied between the outer bearing ring member 4 and the inner bearing ring member 5 is increased. In contrast to this, where the negative axial load is applied, the radial load in the vertical direction based on the moment associated with the axial load is also applied in the negative direction, whereby the radial load in the vertical direction which is applied between the outer bearing ring member 4 and the inner bearing ring member 5 is decreased. Then, when a preload is measured in a state in which the radial load in the vertical direction is small, the effect by the change in offset amount is made small, thereby making it possible to obtain a preload with good accuracy irrespective of the offset amount.

In addition, it is preferable to perform the operation to obtain a preload on the wheel supporting rolling bearing unit in a state in which the running state of the motor vehicle is stabilized. Specifically, it should be avoided to obtain a preload in a state in which the axial load changes drastically within a short period of time, for example, due to an abrupt traveling course (lane) change. Then, it is preferable to obtain a preload in a state in which the axial load is applied stably over a long period of time as when the motor vehicle runs on a curved traveling path of a substantially constant radius of curvature. In addition, to prevent the measurement of a preload in a state in which the load changes drastically to thereby take in preload data of low reliability, a signal indicating the displacement in the (pure) axial direction is subjected to filtering by the low pass filter, thereby making it possible to enhance the reliability with respect to preload measurement.

A double row rolling bearing unit of the second embodiment in which an axial load measuring device and an inclination angle measuring means are built will be described by reference to FIGS. 12 to 19. The double row rolling bearing unit of the second embodiment is a wheel supporting double row rolling bearing unit with a load measuring device and includes a wheel supporting double row rolling bearing unit 1b and a load measuring device 8 which doubles as a rotational speed detecting unit.

Of these units, the wheel supporting double row rolling bearing unit 1b includes an outer bearing ring member 4, an inner bearing ring member 5, and a plurality of rolling elements 6, 6. In these members, the outer bearing ring member 4 is a stationary bearing ring member which is fixedly supported to a knuckle 7 (refer to FIG. 5) which makes up a suspension system when in use and has, respectively, double outer ring raceways 9, 9 on an inner circumferential surface and an outwardly directed flange-shaped mounting portion 10 via which the outer bearing ring member 4 is connected to the suspension system on an outer circumferential surface. In addition, the inner bearing member 5 is a rotary bearing ring (a hub) to which the hub is fixedly supported and which rotates together with the wheel when in use and includes a hub main body 11 and a inner ring 12 which is combined with and fixed to the hub main body 11. The inner bearing ring member 5 has a flange 13 provided at an outer end portion in the axial direction (an end portion on an outer side of the body in the vehicle width direction when assembled on to the suspension system) on an inner circumferential surface for fixedly supporting the wheel and double inner ring raceways 14, 14 which are provided at an intermediate portion in the axial direction and a portion closer to an inner end on the outer circumferential surface. The plurality of rolling elements 6, 6 are rollably arranged in double rows between the inner ring raceways 14, 14 and the outer ring raceways 9, 9, respectively in a state in which contact angles in opposite directions to each other (of a back-to-back duplex type) are applied to the rolling elements 6, 6, in the respective raceways, and the inner bearing ring member 5 is rotatably supported inside the outer bearing ring member 4 in such a manner as to be concentric with the outer bearing ring member.

On the other hand, the load measuring device 8 includes one encoder 15 which is fixedly fitted on an inner end portion in the axial direction of the inner bearing ring member 5, four sensors 17a1, 17a2, 17b1, 17b2 which are supported on a cover 16 which is attached to an inner end in the axial direction of the outer bearing ring member 4 to cover an opening in the inner end, and an arithmetic unit not shown. The encoder 15 is made of a magnetic sheet metal such as a soft sheet steel and has a first characteristic changing portion 18 and a second characteristic changing portion 19 which are provided on a portion closer to a distal end (closer to an inner half in the axial direction) on an outer circumferential surface thereof which constitutes a detectable surface. The first characteristic changing portion 18 and the second characteristic changing portion 19 are made up respectively of pluralities of through holes 20a, 20b which are formed in such a manner as to be spaced apart from each other at regular intervals in a circumferential direction.

Figure 12:
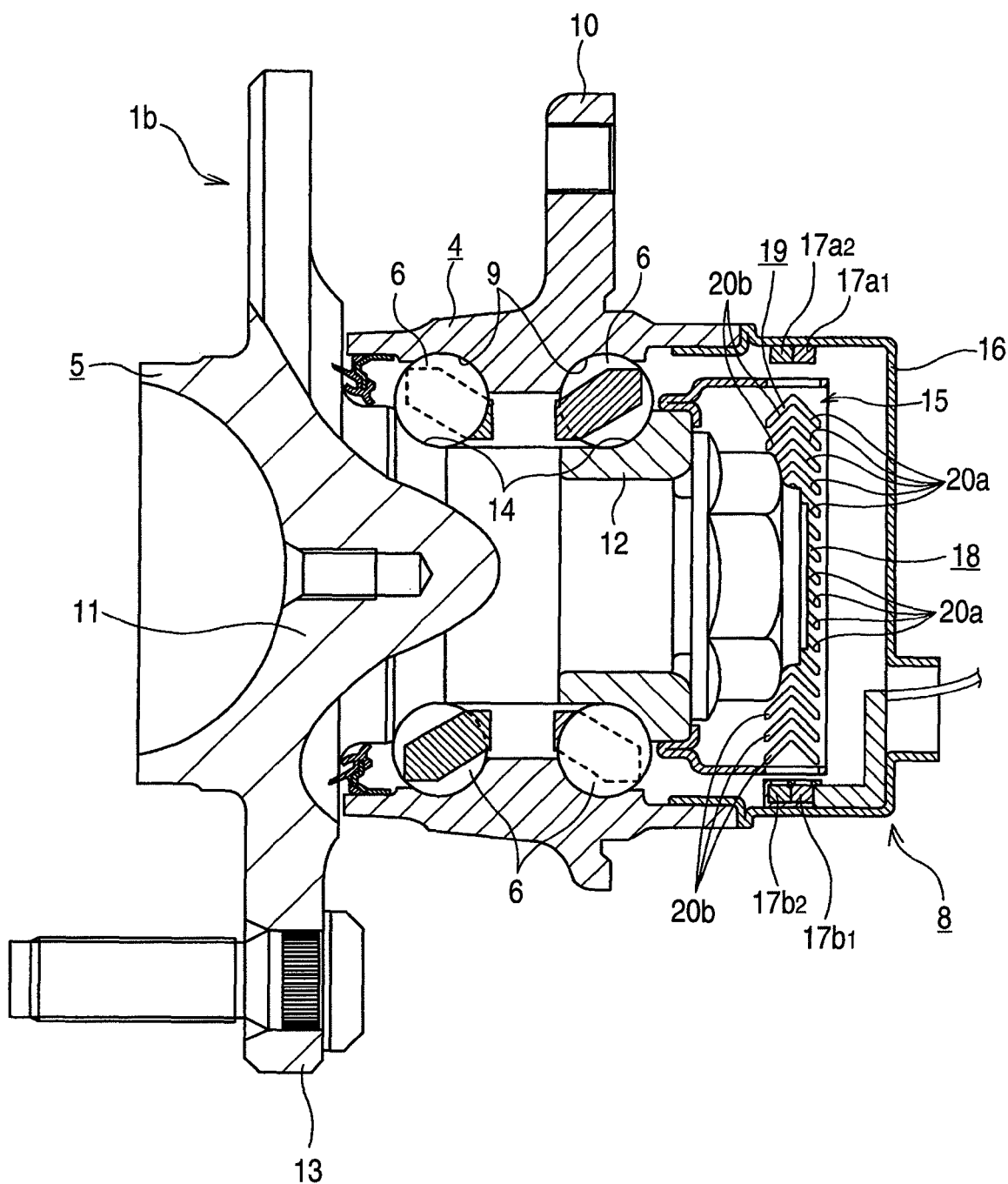
FIG. 12 is a sectional view showing a wheel supporting double row rolling bearing unit with a load measuring device according to the second embodiment.
Figure 18:
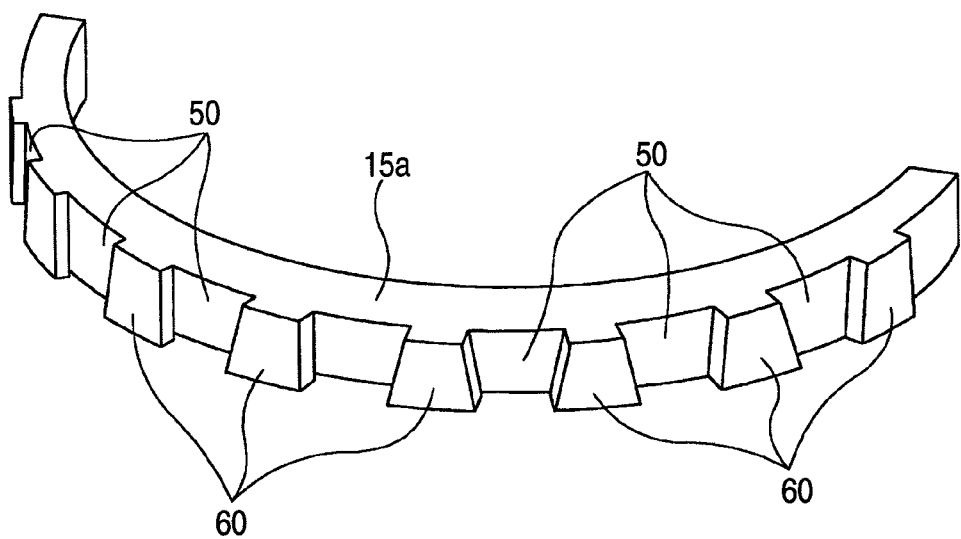
FIG. 18 is a perspective view showing another encoder which can be applied in the present invention.
Figure 19:
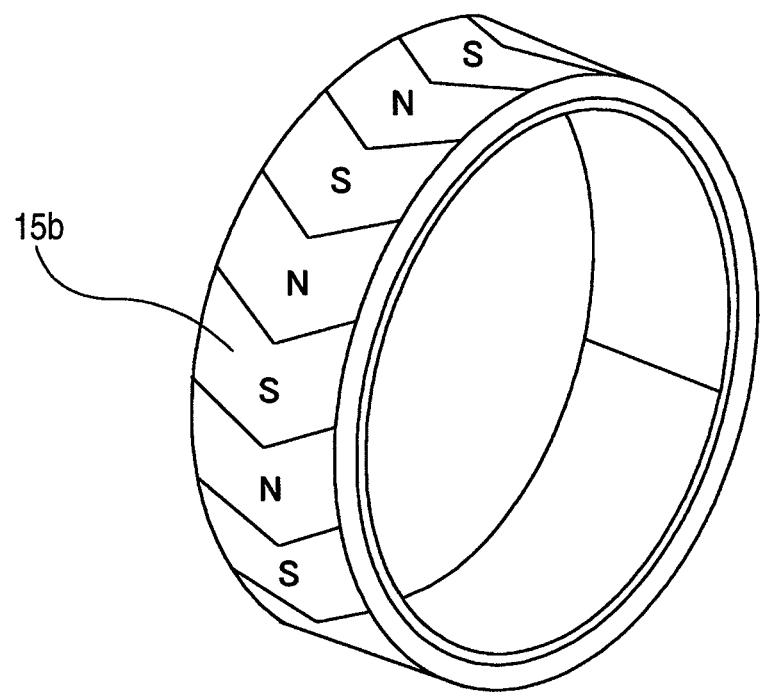
FIG. 19 is a perspective view showing yet another encoder which can be applied in the present invention.

In the first characteristic changing portion 18, a phase in which the characteristics change is provided on one half portion in a width direction of the detectable surface (a right half portion of the encoder 15 shown in FIG. 12, a lower half portion of the encoder 15 shown in FIGS. 13 to 16) in such a manner as to change gradually at a certain angle in a certain direction relative to the width direction of the detectable surface. In contrast to this, in the second characteristic changing portion 19, a phase in which the characteristics change is provided on the other half portion in the width direction of the detectable surface (a left half portion of the encoder 15 shown in FIG. 12 and shown in a left lower portion in FIGS. 13 to 16, a lower half portion of the encoder 15 shown in FIGS. 13 to 16) in such a manner as to change gradually at the same angle as the aforesaid angle in an opposite direction to the aforesaid direction relative to the width direction of the detectable surface. Because of this, the through holes 20a, 20a of the first characteristic changing portion 18 and the through holes 20b, 20b of the second characteristic changing portion 19 are formed in such a manner as to be inclined at the same angle in opposite directions relative to the axial direction of the encoder 15. In addition, as is shown in FIGS. 13 to 16 and 17, the through holes 20a, 20a of the first characteristic changing portion 18 and the through holes 20b, 20b of the second characteristic changing portion 19 may be formed in such a manner as to be independent from each other or may be formed in such a manner as to continue as is shown in FIG. 12. Alternatively, as is shown in FIG. 18, an encoder 15a may be used in which trapezoidal or triangular corrugations 50, 60 are formed on a detectable surface. Furthermore, as is shown in FIG. 19, an encoder 15b made of a permanent magnet may be used in which S poles and N poles are disposed in similar patterns on a detectable surface.

The four sensors 17a1, 17a2, 17b1, 17b2 in total are provided such that the two sensors are disposed in each of two diametrically opposite positions on the detectable surface. Namely, in the four sensors, the two sensors 17a1, 17a2 are disposed above an upper end portion, while the remaining two sensors 17b1, 17b2 are disposed below a lower end portion of the encoder 15. Detecting portions of the sensors 17a1, 17b1 and detecting portions of the sensors 17a2, 17b2 are made to face the first characteristic changing portion 18 and the second characteristic changing portion 19, respectively. The respective detecting portions of the sensors 17a1, 17a2, 17b1, 17b2 face a central portion in the width direction of the first characteristic changing portion 18 or the secondary characteristic changing direction 19 when no external force is applied and the outer bearing ring member 4 and the inner bearing ring member 5 are in a neutral state (a state in which the central axes of both the bearing ring members coincide with each other and no axial displacement is produced).

Detection signals of the respective sensors 17a1, 17a2, 17b1, 17b2 are sent to the arithmetic unit, and the arithmetic unit obtains an inclination angle of the encoder 15 (an inclination angle of a center axis of the outer bearing ring member 4 and a center axis of the inner bearing ring member 5) through the following functions. Namely, the arithmetic unit firstly obtains a ratio 5a regarding a phase difference between detection signals of the two sensors 17a1, 17a2 (a phase difference ratio=a phase difference B/one cycle A) and a phase difference ratio 62 between detection signals of the two sensors 17b1, 17b2, the two sensors 17a1, 17a2 and the two sensors 17b1, 17b2 being disposed at the upper and lower end portions, respectively. Following this, a difference "δa−δb" between the phase difference ratios regarding the two sensors 17a1, 17a2 and the two sensors 17b1, 17b2 which are disposed in both the positions. Furthermore, an inclination angle is obtained based on the difference "δa−δb" between the phase difference ratios.

According to the configuration described above, even when a load that is not a target to be measured (a non-target load) is applied in a perpendicular direction to the direction in which the respective sensors 17a1, 17a2, 17b1, 17b2 are disposed, the occurrence of a deviation in a measured value of a specific target to be measured (a target load) can be prevented. Since the target load is an axial load applied from a contact surface between the wheel and the road surface to the wheel supporting double row rolling bearing unit 1b in the second embodiment, the respective sensors 17a1, 17a2, 17b1, 17b2 are disposed in the upper and lower two positions which face the encoder 15. In this case, when a load in a front-and-rear direction, which is a non-target load is applied in the perpendicular direction (a front-and-rear direction of the vehicle) in a state in which the axial load is applied, the phase difference ratios of the detection signals of the respective sensors 17a1, 17a2, 17b1, 17b2 change irrespective of the target load. Consequently, in the event that the detection signals of the respective sensors 17a1, 17a2, 17b1, 17b2 are not processed properly, the non-target load constitutes a crosstalk to the measurement of a target load, leading a possibility that an error is produced in a measured value of the target load. However, according to the construction of the second embodiment, the non-target load is prevented from constituting the crosstalk, thereby making it possible to enhance the measuring accuracy of the target load.

Figure 13:
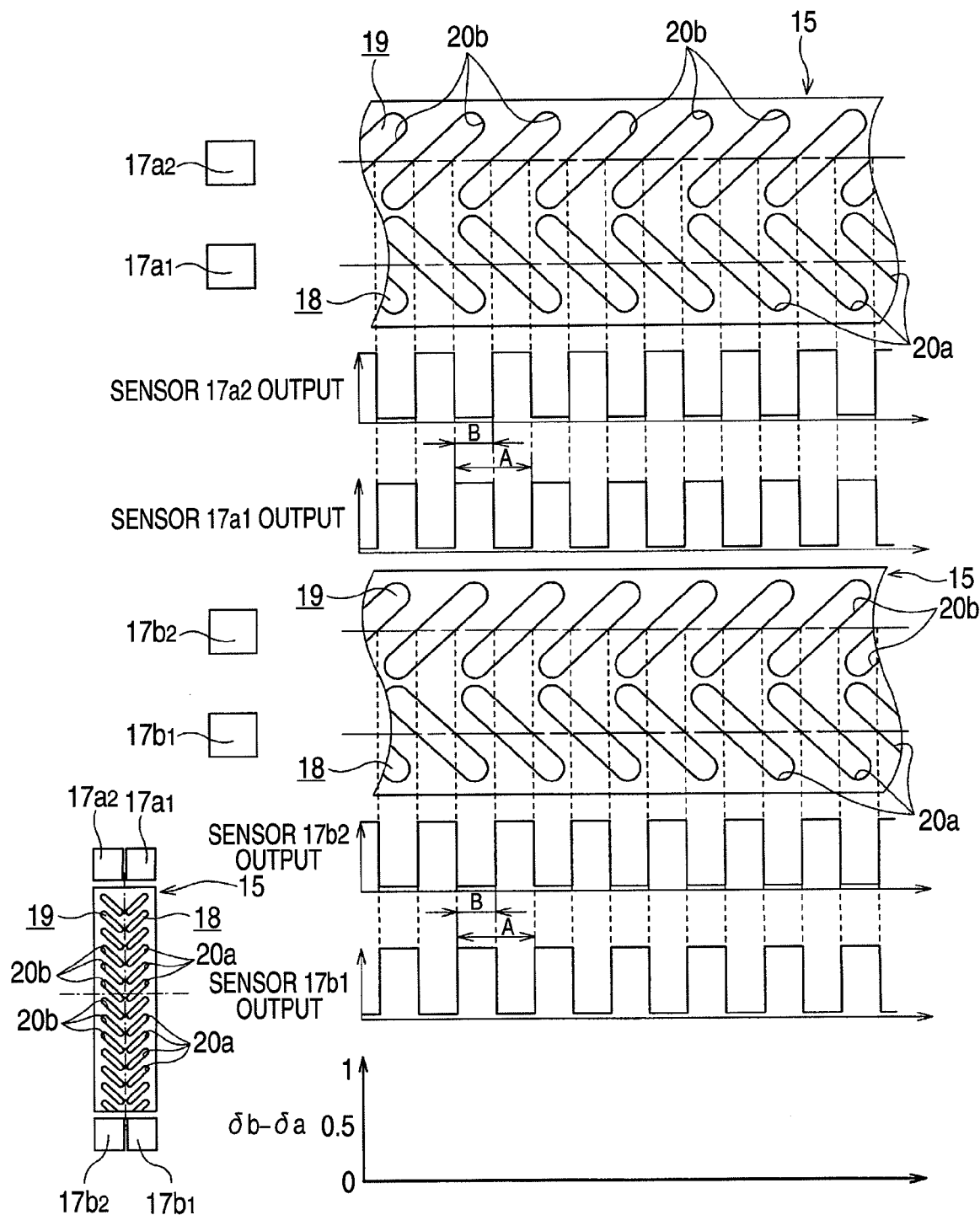
FIG. 13 is a schematic view showing a positional relationship between detecting portions of respective sensors and a detectable surface of an encoder together with a phase of a detection signal of each of the sensors, in a state in which no axial load is acting to the structure shown in FIG. 12.

This will be described in more detail with reference to FIGS. 13 to 16. In the construction of the second embodiment, when no external force is applied and the outer bearing ring member 4 and the inner bearing ring member 5 are in the neutral state, as is shown in FIG. 13, the detection signals of the respective sensors 17a1, 17a2 which are disposed on the upper side and the detection signals of the respective sensors 17b1, 17b2 which are disposed on the lower side coincide with each other. The phases of the detection signals of the two sensors 17a1, 17a2 and the two sensors 17b1, 17b2 which are each disposed in the same position in the circumferential direction are made opposite to each other. Consequently, the phase difference between the sensors 17a1, 17a2 and the phase difference between the sensors 17b1, 17b2 each become 180 degrees, and the phase difference ratios δa, δb (B/A) each become 0.5. Furthermore, the difference "δa−δb" between the phase difference ratios, which constitute a parameter for obtaining an inclination angle of the encoder 15, becomes 0 as is shown in a diagram at a lower end in FIG. 13. It is seen from this that the inclination angle is 0.

Figure 14:
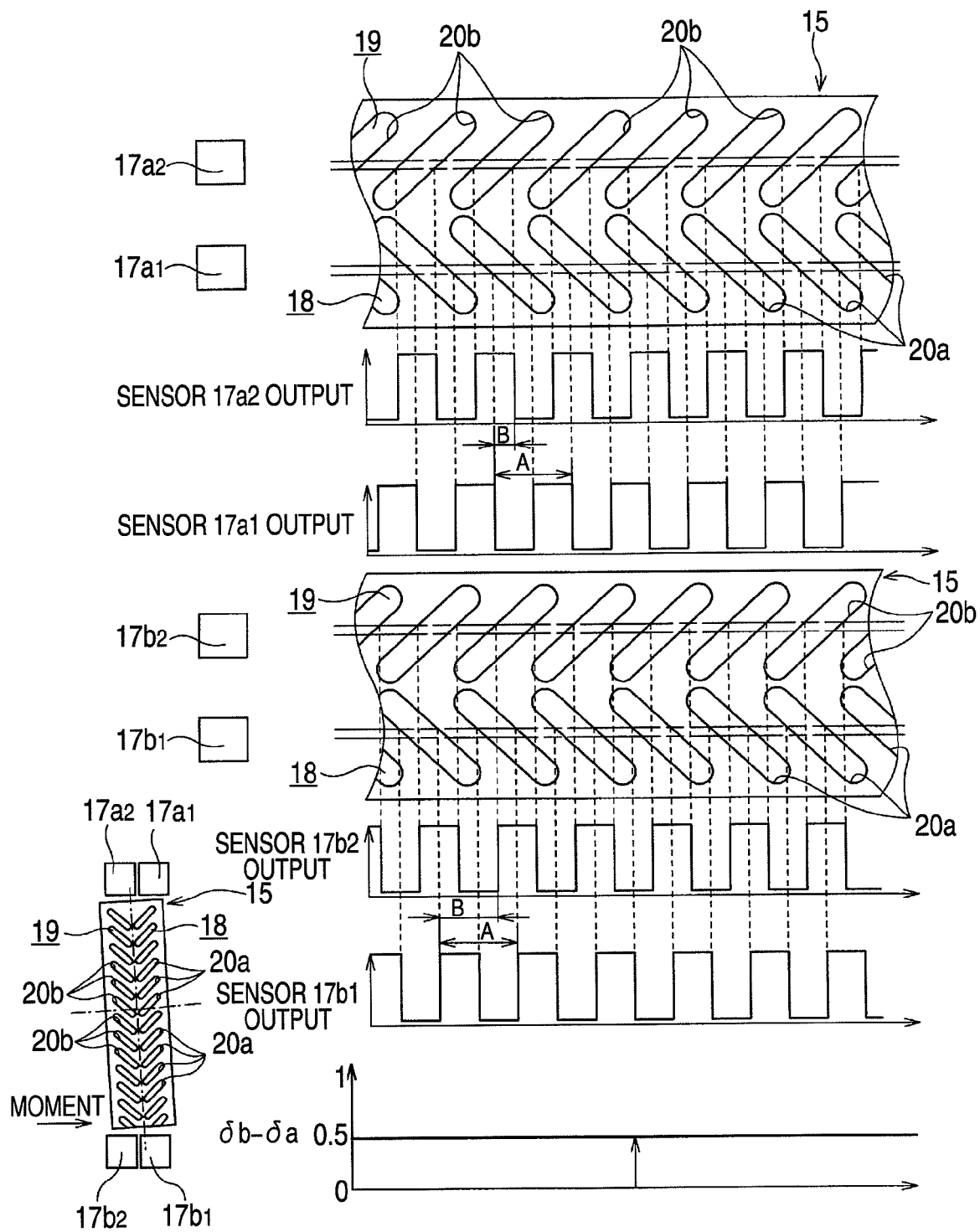
FIG. 14 is a schematic view similar to FIG. 13, but in a state in which the axial load is acting.

Next, a case will be described based on FIG. 14 where the center axis of the outer bearing ring member 4 and the center axis of the inner bearing ring member 5 are inclined by a moment based on an axial load applied from a contact surface between the wheel and the road surface, whereby the encoder 15 is oscillated in a counterclockwise direction in FIG. 12. In this case, for example, as is shown at a left bottom in FIG. 14, an upper portion and a lower portion of the encoder are displaced to the left and to the right, respectively. Then, a detection signal of one of the two sensors 17b1, 17b2 which are provided on the lower side, that is, the sensor 17b1 and a detection signal of the other sensor 17b2 change in a direction in which the phase is delayed and in a direction in which the phase is advanced, respectively. Because of this, the phase difference and the phase difference ratio δb (B/A) of the two sensors 17b1, 17b2 which are provided on the lower side are increased.

In contrast to this, a detection signal of one of the two sensors 17a1, 17a2 which are provided on the upper side, that is, the sensor 17a1 and a detection signal of the other sensor 17a2 change in a direction in which the phase is advanced and in a direction in which the phase is delayed, respectively. Because of this, the phase difference and the phase difference ratio δa (B/A) of the two sensors 17a1, 17a2 which are provided on the upper side are decreased. As a result, the difference "δb−δa" between the phase difference ratios, which constitutes the parameter to obtain the inclination angle of the encoder 15, takes a positive value as is shown in a diagram at a lower end in FIG. 14. Then, an inclination of the encoder 15 and hence, an inclination angle of the center axis of the outer bearing ring member 4 and the center axis of the inner bearing ring member 5 are obtained based on the difference "δb−δa" between the phase difference ratios. In addition, if a relationship between the inclination angle and the moment is obtained, a moment and furthermore an axial load are obtained from the inclination angle so obtained.

Figure 15:
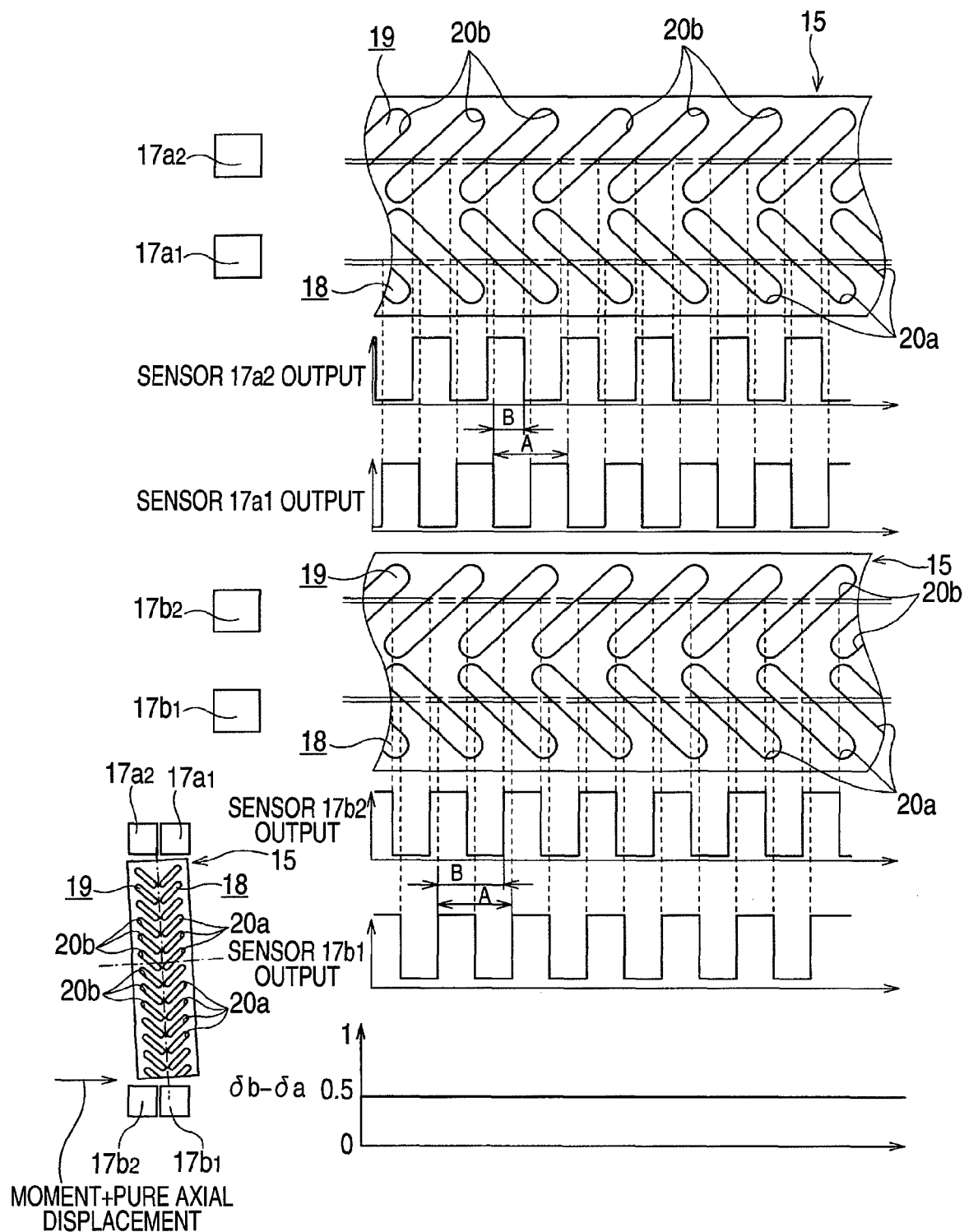
FIG. 15 is another schematic view similar to FIG. 13, but showing a state in which the axial load is acting and a pure axial displacement is generated.

In addition, according to the second embodiment, even though the encoder 15 is displaced in the axial direction relative to the respective sensors 17a1, 17a2, 17b1, 17b2, the difference "δb−δa" between the phase difference ratios is changed in no case. FIG. 15 shows a state in which the encoder 15 is displaced in the pure axial direction from the state shown in FIG. 14. In contrast to the state shown in FIG. 14, in the state shown in FIG. 15, the upper portion and the lower portion of the encoder are displaced in the same direction, the phase difference and the phase difference ratio δa of the two sensors 17a1, 17a2 which are provided on the upper side and the phase difference and the phase difference ratio δb of the two sensors 17b1, 17b2 which are provided on the lower side are changed by the same amount in the same direction. As a result, the difference "δb−δa" between the phase difference ratios is changed in no case as is described above. Because of this, even though the axial displacement occurs due to thermal expansion or contraction, an inclination angle can be detected without being affected by the displacement so occurring.

Figure 16:
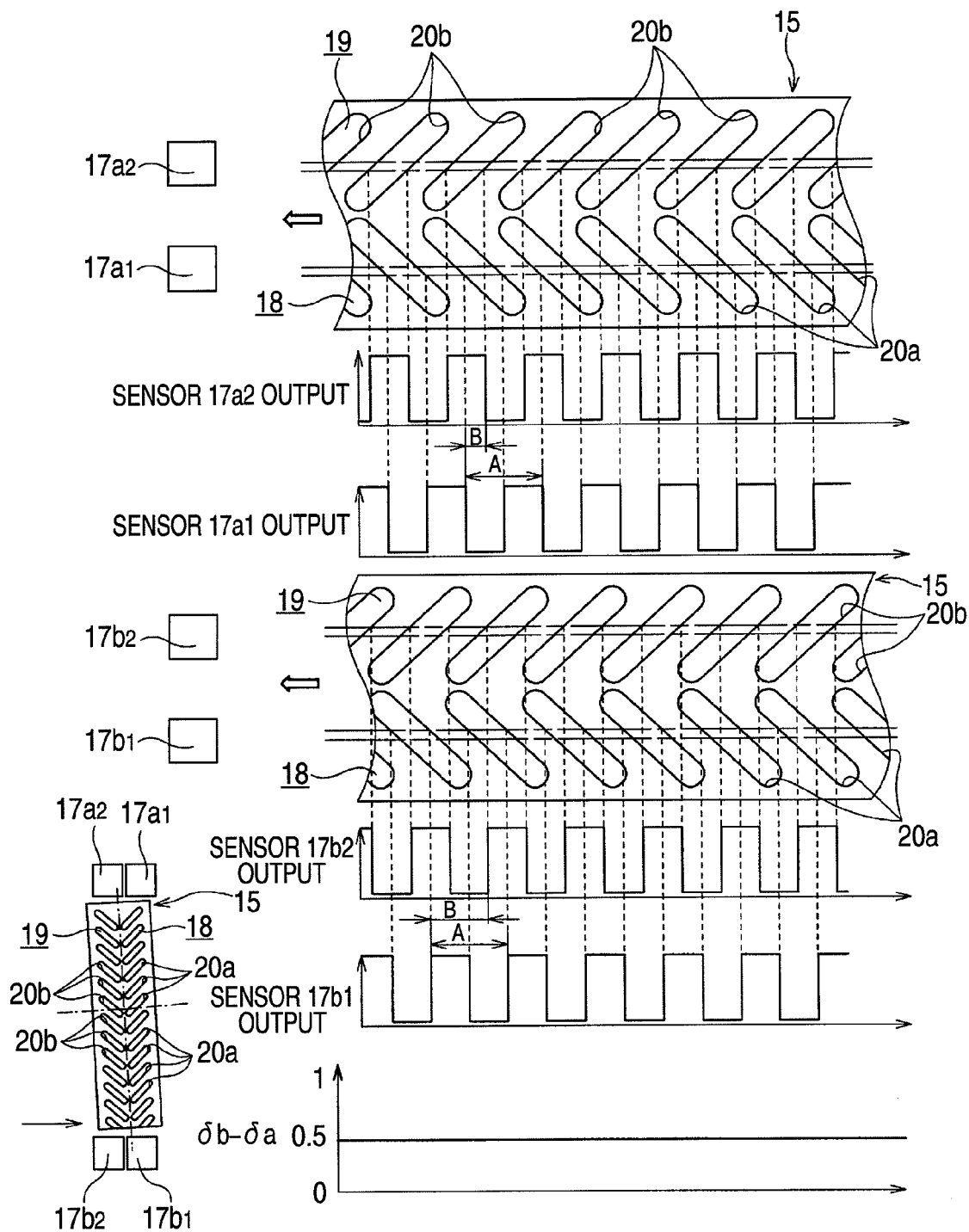
FIG. 16 is another schematic view similar to FIG. 13, but showing a state in which a radial load is acting in a front-and-rear direction together with the axial load.
Figure 17:
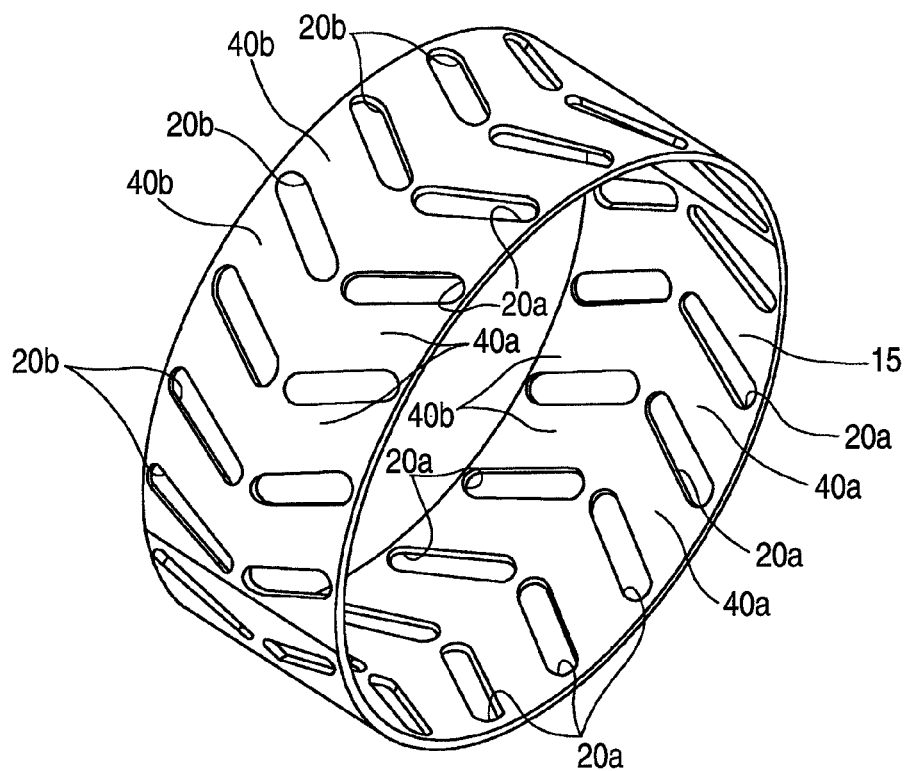
FIG. 17 is a perspective view of an encoder used in the first embodiment and the second embodiment.

Furthermore, according to the second embodiment, even though the inner bearing ring member 5 is displaced in the front-and-rear direction relative to the outer bearing ring member 4 (a front-and-rear radial displacement is generated) by the front-and-rear force which is the non-target load, it becomes possible to prevent the production of an error in a measured value of the inclination angle of the encoder 15 and hence a measured value of the axial load which is the target load by the non-target load. This will be described based on FIG. 16. When the encoder 15 is displaced in the front-and-rear direction by the front-and-rear force, the positional relationship between the two sensors 17a1, 17a2 which are provided on the upper side and the two sensors 17b1, 17b2 which are provided on the lower side is collapsed, the encoders 15 shown in an upper position and an intermediate position in FIG. 16 are caused to deviate in a horizontal direction). However, the directions of deviation between the two sensors 17a1, 17a2 which are provided on the upper side and between the two sensors 17b1, 17b2 which are provided on the lower side become the same as each other with respect to advancement or delay of detection signals (the directions of deviation between the upper side and the lower side become opposite to each other). Because of this, both the phase difference δa between the detection signals of the two sensors 17a1, 17a2 which are provided on the upper side and the phase difference δb between the detection signals of the two sensors 17b1, 17b2 which are provided on the lower side do not change. Consequently, the difference "δb−δa" between the phase difference ratios, which constitutes the parameter for obtaining the inclination angle of the encoder 15, is changed in no case (the same as the case shown in FIG. 14). Because of this, even though the encoder is displaced in the front-and-rear direction by a force applied between the outer bearing ring member 4 and the inner bearing ring member 5 in the front-and-rear direction based on a driving force or braking force, the displacement does not constitute a crosstalk to the measurement of an inclination angle, and this inclination angle can be obtained with good accuracy.

On the contrary, in a case where neither driving force nor braking force is applied and no front-and-rear displacement is generated or where the displacement is so small as to be ignored even with a front-and-rear displacement being generated, a similar effect can be obtained without using all the four sensors 17a1, 17a2, 17b1, 17b2 shown in the drawings. Specifically, when the front-and-rear displacement can be ignored as is described above, in the four sensors 17a1, 17a2, 17b1, 17b2 shown in FIG. 12, for example, the sensor 17a1 being omitted, only the remaining three sensors 17a2, 17b1, 17b2 are mounted. Then, an inclination angle is obtained from a phase difference ratio between an output signal of the sensor 17a2 and an output signal of the sensor 17b2. In addition, a axial displacement at the lower portion of the encoder is obtained from a phase difference ratio between an output signal of the sensor 17b1 and the output signal of the sensor 17b2. With the inclination angle of the encoder 15 and the axial displacement at the lower portion of the encoder 15 coming to be known, a pure axial displacement of the encoder 15 is also obtained. Namely, in such a situation that the front-and-rear displacement can be ignored, by mounting the three sensors 17a2, 17b1, 17b2, the similar effect can be obtained to the effect that can be obtained when the four sensors 17a1, 17a2, 17b1, 17b2 are used. Further, if the load measuring device includes only the three sensors 17a2, 17b1, 17b2, when the front-and-rear displacement does not have to be considered as described above, the number of sensors is reduced, so as to suppress the sensor procurement costs. Effectiveness like this can be obtained not only by omitting the sensor 17a1 but also by omitting any one of the sensors 17a1, 17a2, 17b1, 17b2.

According to the second embodiment, as has been described above, the inclination angle of the center axis of the outer bearing ring member 4 and the center axis of the inner bearing ring member 5 can be obtained with good accuracy. In addition, the axial displacement of the outer bearing member 4 and the inner bearing ring member 5 can also be obtained with good accuracy from the phase difference ratio δa of the detection signals of the two sensors 17a1, 17a2 which are provided on the upper side and the phase difference ratio δb of the detection signals of the two sensors 17b1, 17b2 which are provided on the lower side. Namely, the phase difference ratio δa of the detection signals of the two sensors 17a1, 17a2 which are provided on the upper side takes a value which is proportional to the axial displacement at the upper end portion of the encoder 15. In addition, the phase difference ratio δb of the detection signals of the two sensors 17b1, 17b2 which are provided on the lower side takes a value which is proportional to the axial displacement at the lower end portion of the encoder 15. In addition, a average value {(δa+δb)/2} of both the phase difference ratios takes a value which is proportional to the axial displacement of the outer bearing ring member 4 and the inner bearing ring member 5.

As is obvious from the explanation of above, the average value {(δa+δb)/2} contains the axial displacement based on thermal expansion or contraction which is produced irrespective of the axial load. However, since the axial displacement based on thermal expansion or contract changes gradually, a correction to cancel the effect thereof is easy. Specifically, the average value {(δa+δb)/2} resulting in a state in which no axial load is applied is made to take such a value that the axial load corresponds to zero based on signals from a steering sensor which indicates the manipulating angle of the steering wheel, a yaw rate sensor which indicates a yaw rated applied to the body or a lateral G sensor. Then, the axial displacement is obtained based on the value of the average value which corresponds to zero and the value of the average value used when obtaining the axial displacement (in a state in which the axial load is applied) to obtain a preload. Then, a preload applied to the respective rolling elements 6, 6 is obtained in the manner that has been described before based on the axial displacement so obtained and the inclination angle.

While the present invention has been described in detail and with reference to specific embodiments, those skilled in the art will understand that various changes and modifications may be therein without departing from the spirit and scope of the invention.

The present application is based on Japanese Patent Application No. 2005-118080 filed on Apr. 15, 2005, Japanese Patent Application No. 2005-296053 filed on Oct. 11, 2005, and Japanese Patent Application No. 2006-065675 filed on Mar. 10, 2006, the contents of which are incorporated herein by reference.

INDUSTRIAL APPLICABILITY

The above description has been made heretofore for a case where the present invention is applied to the wheel supporting double row rolling bearing unit and where the preload obtained is used for correcting the relational expression or the map for use in obtaining the axial load applied to this wheel supporting double row rolling bearing unit. In addition to this, the preload measuring device for the double row rolling bearing unit according to the invention can also be used to estimate other conditions or a life of the double row rolling bearing unit based on the preload so obtained. Further, the rolling elements of the double row rolling bearing unit are not limited to the balls as illustrated in the drawings, and may be cylindrical rollers, tapered rollers or spherical rollers, provided that a preload is imparted thereto by applying a force in the axial direction.

The invention claimed is:

1. A preload measuring device for a double row rolling bearing unit comprising:
an outer bearing ring member having double rows of outer ring raceways on an inner circumferential surface thereof;
an inner bearing ring member having double rows of inner ring raceways on an outer circumferential surface thereof;
a plurality of rolling elements rollably arranged between the outer ring raceways and the inner ring raceways in each of the rows such that contact angles given to the respective rows of the rolling elements are opposite to one another;
axial displacement measuring means for obtaining an axial relative displacement between the outer bearing ring member and the inner bearing ring member;
inclination angle measuring means for obtaining an inclination angle between a center axis of the outer bearing ring member and a center axis of the inner bearing ring member; and
preload calculating means for obtaining a preload applied to the plurality of rolling elements based on the inclination angle and the axial relative displacement.

2. The preload measuring device for a double row rolling bearing unit according to claim 1, wherein the preload calculating means obtains the preload based on a comparison between the axial relative displacement and the inclination angle.

3. The preload measuring device for a double row rolling bearing unit according to claim 2, wherein the preload calculating means obtains the preload based on a ratio between the axial relative displacement and the inclination angle.

4. The preload measuring device for a double row rolling bearing unit according to claim 2, wherein the axial displacement measuring means and the inclination angle measuring means are incorporated in the double row rolling bearing unit.

5. The preload measuring device for a double row rolling bearing unit according to claim 4, further comprising:
an encoder having a detectable surface on a circumferential surface thereof, wherein a characteristic of the detectable surface changes alternately with respect to a circumferential direction and a pitch of a characteristic change changes with respect to an axial direction; and
a plurality of sensors having detecting portions facing the detectable surface of the encoder,
wherein the encoder is disposed on either one of the outer bearing ring member and the inner bearing member that rotates when in use, such that the detectable surface is concentrically positioned thereto,
the plurality of sensors are supported by the other of the outer bearing ring member and the inner bearing ring member that does not rotate when in use, and
the axial displacement measuring means and the inclination angle measuring means obtain, respectively, the axial relative displacement and the inclination angle based on a duty ratio of output signals from the plurality of sensors.

6. The preload measuring device for a double row rolling bearing unit according to claim 5, wherein the plurality of sensors faces and upper end portion and a lower end portion of the detectable surface of the encoder respectively.

7. The preload measuring device for a double row rolling bearing unit according to claim 5, further comprising load calculation means for obtaining a load acting between the outer bearing ring member and the inner bearing ring member based on one or both of the axial relative displacement obtained by the axial displacement measuring means and the inclination angle obtained by the inclination angle measuring means.

8. The preload measuring device for a double row rolling bearing unit according to claim 7, wherein the load calculating means obtains the load acting between the outer bearing ring member and the inner bearing ring member based on a map indicative of a relationship between an axial load and the axial displacement or the inclination angle, and
the preload calculating means corrects the map based on the obtained preload.

9. The preload measuring device for a double row rolling bearing unit according to claim 8, wherein the inner bearing ring member is a hub which rotates together with a wheel of a vehicle,
- the outer bearing ring member is fixedly supported on a suspension system of the vehicle, and
- the preload calculating means obtains the preload while the axial load is acting on the hub toward an outside with respect to a width direction of the vehicle, and corrects the map based on the obtained preload.

10. The preload measuring device for a double row rolling bearing unit according to claim 7, wherein the preload calculating means corrects the axial relative displacement obtained by the displacement measuring means based on the inclination angle obtained by the inclination angle measuring means, and obtains the preload based on the corrected axial relative displacement.

11. The preload measuring device for a double row rolling bearing unit according to claim 5, wherein the inner bearing ring member is a hub which rotates together with a wheel of a vehicle, and
- the outer bearing ring member is fixedly supported on a suspension system of the vehicle.

12. The preload measuring device for a double row rolling bearing unit according to claim 4, further comprising:
- an encoder having a detectable surface on a circumferential surface thereof, wherein a characteristic of the detectable surface changes alternately and at regular intervals with respect to a circumferential direction and a phase of a characteristic change changes with respect to an axial direction; and
- a plurality of sensors having detecting portions facing different portions on the detectable surface of the encoder,
- wherein the encoder is disposed on either one of the outer bearing ring member and the inner bearing member that rotates when in use, such that the detectable surface is concentrically positioned thereto,
- the plurality of sensors are supported by the other of the outer bearing ring member and the inner bearing ring member that does not rotate when in use, and
- the axial displacement measuring means and the inclination angle measuring means obtain, respectively, the axial relative displacement and the inclination angle based on a phase difference between output signals from the plurality of sensors.

13. The preload measuring device for a double row rolling bearing unit according to claim 12, wherein the plurality of sensors faces and upper end portion and a lower end portion of the detectable surface of the encoder respectively.

14. The preload measuring device for a double row rolling bearing unit according to claim 12, further comprising load calculation means for obtaining a load acting between the outer bearing ring member and the inner bearing ring member based on one or both of the axial relative displacement obtained by the axial displacement measuring means and the inclination angle obtained by the inclination angle measuring means.

15. The preload measuring device for a double row rolling bearing unit according to claim 14, wherein the preload calculating means corrects the axial relative displacement obtained by the displacement measuring means based on the inclination angle obtained by the inclination angle measuring means, and obtains the preload based on the corrected axial relative displacement.

16. The preload measuring device for a double row rolling bearing unit according to claim 14, wherein the load calculating means obtains the load acting between the outer bearing ring member and the inner bearing ring member based on a map indicative of a relationship between an axial load and the axial displacement or the inclination angle, and
- the preload calculating means corrects the map based on the obtained preload.

17. The preload measuring device for a double row rolling bearing unit according to claim 16, wherein the inner bearing ring member is a hub which rotates together with a wheel of a vehicle,
- the outer bearing ring member is fixedly supported on a suspension system of the vehicle, and
- the preload calculating means obtains the preload while the axial load is acting on the hub toward an outside with respect to a width direction of the vehicle, and corrects the map based on the obtained preload.

18. The preload measuring device for a double row rolling bearing unit according to claim 12, wherein the inner bearing ring member is a hub which rotates together with a wheel of a vehicle, and
- the outer bearing ring member is fixedly supported on a suspension system of the vehicle.

* * * * *